US011947801B2

(12) United States Patent
Lal et al.

(10) Patent No.: US 11,947,801 B2
(45) Date of Patent: Apr. 2, 2024

(54) IN-PLACE MEMORY COPY DURING REMOTE DATA TRANSFER IN HETEROGENEOUS COMPUTE ENVIRONMENT

(71) Applicant: Intel Corporation, Santa Clara, CA (US)

(72) Inventors: Reshma Lal, Portland, OR (US); Sarbartha Banerjee, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/876,936

(22) Filed: Jul. 29, 2022

(65) Prior Publication Data
US 2024/0036733 A1 Feb. 1, 2024

(51) Int. Cl.
G06F 12/1009 (2016.01)
G06F 3/06 (2006.01)
G06F 12/14 (2006.01)

(52) U.S. Cl.
CPC .......... *G06F 3/0611* (2013.01); *G06F 3/0659* (2013.01); *G06F 3/0673* (2013.01); *G06F 12/1009* (2013.01); G06F 12/1408 (2013.01)

(58) Field of Classification Search
None
See application file for complete search history.

(56) References Cited

U.S. PATENT DOCUMENTS

| 6,081,833 A * | 6/2000 | Okamoto | H04L 49/309 |
| | | | 711/147 |
| 2007/0260768 A1* | 11/2007 | Bender | G06F 13/28 |
| | | | 710/22 |
| 2021/0117246 A1* | 4/2021 | Lal | G06F 9/3814 |
| 2021/0311629 A1* | 10/2021 | Pappachan | G06F 3/062 |
| 2022/0308755 A1* | 9/2022 | Ng | G06F 12/1475 |

OTHER PUBLICATIONS

Volos et al. "Graviton: Trusted Execution Environments on GPUs." Oct. 2018. USENIX. OSDI '18. pp. 681-696.*

* cited by examiner

*Primary Examiner* — Nathan Sadler
(74) *Attorney, Agent, or Firm* — JEFFERY WATSON MENDONSA & HAMILTON LLP

(57) ABSTRACT

An apparatus to facilitate in-place memory copy during remote data transfer in a heterogeneous compute environment is disclosed. The apparatus includes a processor to receive data via a network interface card (NIC) of a hardware accelerator device; identify a destination address of memory of the hardware accelerator device to write the data; determine that access control bits of the destination address in page tables maintained by a memory management unit (MMU) indicate that memory pages of the destination address are both registered and free; write the data to the memory pages of the destination address; and update the access control bits for memory pages of the destination address to indicate that the memory pages are restricted, wherein setting the access control bits to restricted prevents the NIC and a compute kernel of the hardware accelerator device from accessing the memory pages.

20 Claims, 18 Drawing Sheets

1200

Receive data at a network interface card (NIC) of a hardware accelerator device as part of data transfer from application of remote application server platform
1210

Identify a destination address of memory to write the data
1220

Determine that access control bits of destination address in memory management unit (MMU) page tables indicate memory pages of destination address are registered and free memory pages
1230

Write the data to the memory pages of the destination address
1240

Update access control bits for memory pages of destination address to indicate memory pages are restricted
1250

Responsive to successful integrity verification of the data transfer, update access control bits for memory pages of destination address to indicate memory pages are live, where a compute kernel of the hardware accelerator device can consume the data from the memory pages when the access control bits indicate the memory pages are live
1260

*FIG. 12*

IN-PLACE MEMORY COPY DURING REMOTE DATA TRANSFER IN HETEROGENEOUS COMPUTE ENVIRONMENT

FIELD

This description relates generally to data processing and more particularly to in-place memory copy during remote data transfer in a heterogeneous compute environment.

BACKGROUND

Confidential computing enables users to maintain confidentiality and integrity of their data and code in the presence of software and hardware exploits on the platform where the users are running their application. One way this is enabled is through use of Trusted Execution Environment (TEE) technologies, such as Intel® Software Guard Extensions (SGX), AMD® Secure Enterprise Virtualization (SEV) and Intel® Trusted Domain Extension (TDX), that provide hardware-enforced isolation to application code and data during execution.

Massive compute needs of applications, such as artificial intelligence (AI)/machine learning (ML) and data analytics, have made computing heterogeneous. Heterogeneous computing refers to a compute environment where parts of an application are accelerated on one or more hardware accelerator such as a graphics processing unit (GPU), field-programmable gate array (FPGA), or purpose-built application specific integrated circuits (ASICs), to name a few examples.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted; however, that the appended drawings illustrate typical embodiments and are therefore not to be considered limiting of its scope.

FIG. 12 is a flow diagram illustrating a method for in-place memory copy during remote data transfer in a heterogeneous compute environment, in accordance with implementations herein.

DETAILED DESCRIPTION

Figure 1:
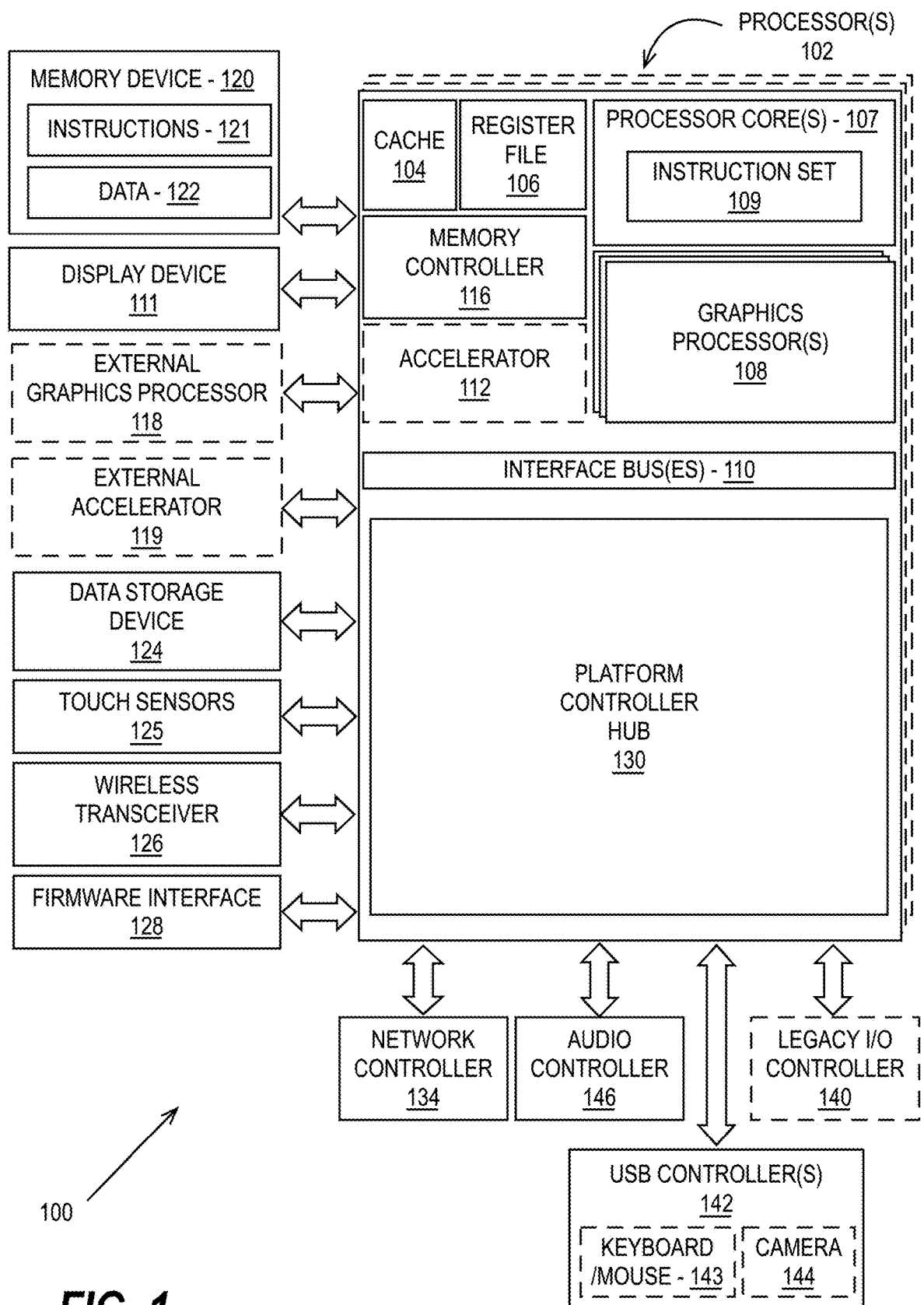
FIG. 1 is a block diagram of a processing system, according to an embodiment.

Confidential computing enables users to maintain confidentiality and integrity of their data and code in the presence of software and hardware exploits on the platform where the users are running their application. One way this is enabled is through use of Trusted Execution Environment (TEE) technologies, such as Intel® Software Guard Extensions (SGX), AMD® Secure Enterprise Virtualization (SEV) and Intel® Trusted Domain Extension (TDX), that provide hardware-enforced isolation to application code and data during execution.

Massive compute needs of applications, such as artificial intelligence (AI)/machine learning (ML) and data analytics, have made computing heterogeneous. Heterogeneous computing refers to a compute environment where parts of an application are accelerated on one or more hardware accelerator, such as a graphics processing unit (GPU), field-programmable gate array (FPGA), or purpose-built application specific integrated circuits (ASICs), to name a few examples. The portion of workload offloaded to an accelerator is known as a compute kernel.

In heterogeneous computing (sometimes referred to as disaggregated computing), processors (such as CPUs) and hardware accelerators (CPU, FPGA, ASICs) may be network-connected and data may be transferred amongst each other using direct memory copy from one device's memory to another device's memory using protocols, such as remote direct memory access (RDMA). For example, an application running on a CPU may copy data into the memory of a remote hardware accelerator directly via network interface cards (NICs) that support RDMA protocol.

For confidential computing solutions, data may be encrypted and integrity-protected during memory copy to prevent software and/or network adversaries from stealing or modifying data without detection. However, software and network adversaries, such a malicious NIC, can change the address of the destination buffer during direct memory copy from the application's memory to the accelerator's memory, which can result in corruption of accelerator's memory. To prevent this, the incoming data coming from another device or NIC may be first copied into a temporary buffer (also referred to as a staging buffer) on the accelerator where it is decrypted and integrity is verified. The destination address is sent to the accelerator securely, either appended to the data package or separately sent, and the incoming address is verified against the expected address before it is copied from the temporary buffer to the destination buffer.

However, a technical problem resulting from this extra copy is that it incurs added latency to the data transfer, especially if the data block is large (such as with artificial intelligence (AI)/machine learning (ML) workloads). Also, the extra copy allocates temporary buffers, which can be substantially large and take away memory resources from the accelerator's compute kernel.

Embodiments herein provide for novel techniques to address the above-noted technical drawbacks by providing for in-place memory copy during remote data transfer in a heterogeneous compute environment. Implementations provide for a hardware access control mechanism in the accelerator's memory management unit (that controls access to accelerator pages through page tables), to gate write transactions into the accelerator memory from a peer or NIC device without going through a staging or temporary buffer. Implementations herein define a state machine to transition the availability of accelerator pages for memory copy and compute kernel's use that prevent data corruption and ensure compute kernel does not consume invalid data.

In the following description, numerous specific details are set forth to provide a more thorough understanding. However, it may be apparent to one of skill in the art that the embodiments described herein may be practiced without one or more of these specific details. In other instances, well-known features have not been described to avoid obscuring the details of the present embodiments.

System Overview

While the concepts of the description herein are susceptible to various modifications and alternative forms, specific embodiments thereof have been shown by way of example in the drawings and will be described herein in detail. It should be understood, however, that there is no intent to limit the concepts of description to the particular forms disclosed, but on the contrary, the intention is to cover all modifications, equivalents, and alternatives consistent with the description and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be utilized. Rather, in some embodiments, such features may be arranged in a different manner and/or order than shown in the illustrative figures. Additionally, the inclusion of a structural or method feature in a particular figure is not meant to imply that such feature is utilized in all embodiments and, in some embodiments, may not be included or may be combined with other features.

Referring now to FIG. 1, a block diagram of a processing system 100, according to an embodiment. Processing system 100 (also referred to as system 100 herein) may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In one embodiment, the accelerator 112 is a field programmable gate array (FPGA). An FPGA refers to an integrated circuit (IC) including an array of programmable logic blocks that can be configured to perform simple logic gates and/or complex combinatorial functions, and may also include memory elements. FPGAs are designed to be configured by a customer or a designer after manufacturing. FPGAs can be used to accelerate parts of an algorithm, sharing part of the computation between the FPGA and a general-purpose processor. In some embodiments, accelerator 112 is a GPU or an application—specific integrated circuit (ASIC). In some implementations, accelerator 112 is also referred to as a compute accelerator or a hardware accelerator.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It may be appreciated that the system 100 shown is one example and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., graphics processing unit (GPUs), graphics accelerators, FPGAs, ASICs, neural network and/or artificial intelligence accelerators, etc.), and data storage drives that are physically disaggregated, and provide them to compute resources (e.g., processors), enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 2:
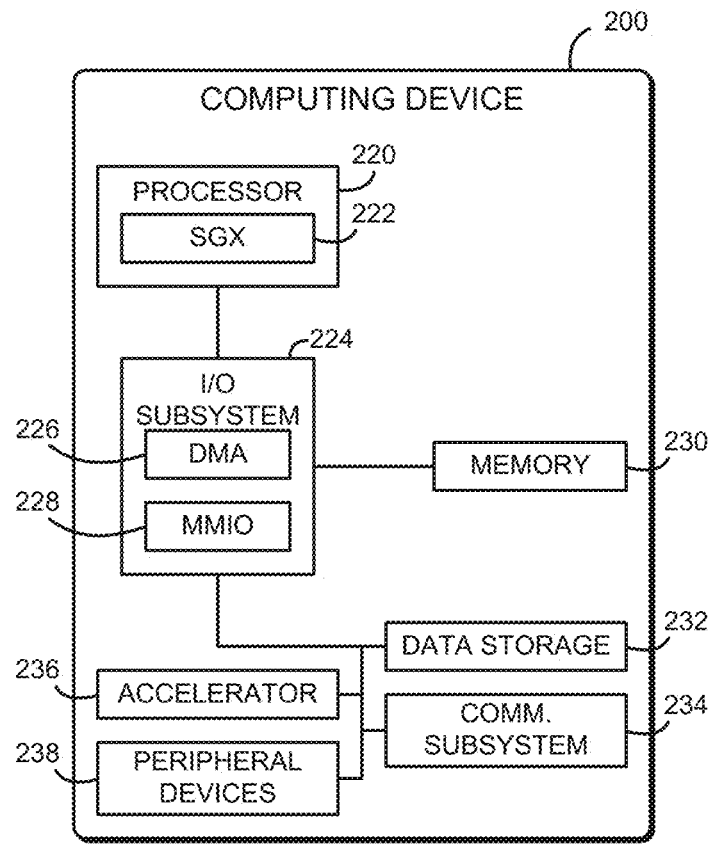
FIG. 2 is a simplified block diagram of at least one embodiment of a computing device for secure I/O with an accelerator device.

FIG. 2 illustrates a block diagrams of an additional processing system architecture provided by embodiments described herein. A computing device 200 for secure I/O with an accelerator device includes a processor 220 and an accelerator device 236, such as a field-programmable gate array (FPGA). In use, as described further below, a trusted execution environment (TEE) established by the processor 220 securely communicates data with the accelerator 236. Data may be transferred using memory-mapped I/O (MMIO) transactions or direct memory access (DMA) transactions. For example, the TEE may perform an MMIO write transaction that includes encrypted data, and the accelerator 236 decrypts the data and performs the write. As another example, the TEE may perform an MMIO read request transaction, and the accelerator 236 may read the requested data, encrypt the data, and perform an MMIO read response transaction that includes the encrypted data. As yet another example, the TEE may configure the accelerator 236 to perform a DMA operation, and the accelerator 236 performs a memory transfer, performs a cryptographic operation (i.e., encryption or decryption), and forwards the result. As described further below, the TEE and the accelerator 236 generate authentication tags (ATs) for the transferred data and may use those ATs to validate the integrity of the transactions. The computing device 200 may thus keep untrusted software of the computing device 200, such as the operating system or virtual machine monitor, outside of the trusted code base (TCB) of the TEE and the accelerator 236. Thus, the computing device 200 may secure data exchanged or otherwise processed by a TEE and an accelerator 236 from an owner of the computing device 200 (e.g., a cloud service provider) or other tenants of the computing device 200. Accordingly, the computing device 200 may improve security and performance for multi-tenant environments by allowing secure use of accelerator devices.

The computing device 200 may be embodied as any type of device capable of performing the functions described herein. For example, the computing device 200 may be embodied as, without limitation, a computer, a laptop computer, a tablet computer, a notebook computer, a mobile computing device, a smartphone, a wearable computing device, a multiprocessor system, a server, a workstation, smartNIC, storage, and/or a consumer electronic device. As shown in FIG. 2, the illustrative computing device 200 includes a processor 220, an I/O subsystem 224, a memory 230, and a data storage device 232. Additionally, in some embodiments, one or more of the illustrative components may be incorporated in, or otherwise form a portion of, another component. For example, the memory 230, or portions thereof, may be incorporated in the processor 220 in some embodiments.

The processor 220 may be embodied as any type of processor capable of performing the functions described herein. For example, the processor 220 may be embodied as a single or multi-core processor(s), digital signal processor, microcontroller, or other processor or processing/controlling circuit. As shown, the processor 220 illustratively includes secure enclave support 222, which allows the processor 220 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 220 while being executed or while being stored in certain protected cache memory of the processor 220. The code and data included in the secure enclave may be encrypted when stored in a shared cache or the main memory 230. The secure enclave support 222 may be embodied as a set of processor instruction extensions that allows the processor 220 to establish one or more secure enclaves in the memory 230. For example, the secure enclave support 222 may be embodied as Intel® Software Guard Extensions (SGX) technology.

The memory 230 may be embodied as any type of volatile or non-volatile memory or data storage capable of performing the functions described herein. In operation, the memory 230 may store various data and software used during operation of the computing device 200 such as operating systems, applications, programs, libraries, and drivers. As shown, the memory 230 may be communicatively coupled to the processor 220 via the I/O subsystem 224, which may be embodied as circuitry and/or components to facilitate input/output operations with the processor 220, the memory 230, and other components of the computing device 200. For example, the I/O subsystem 224 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 230 may be directly coupled to the processor 220, for example via an integrated memory controller hub. Additionally, in some embodiments, the I/O subsystem 224 may form a portion of a system-on-a-chip (SoC) and be incorporated, along with the processor 220, the memory 230, the accelerator device 236, and/or other components of the computing device 200, on a single integrated circuit chip. Additionally, or alternatively, in some embodiments the processor 220 may include an integrated memory controller and a system agent, which may be embodied as a logic block in which data traffic from processor cores and I/O devices converges before being sent to the memory 230.

As shown, the I/O subsystem 224 includes a direct memory access (DMA) engine 226 and a memory-mapped I/O (MMIO) engine 228. The processor 220, including secure enclaves established with the secure enclave support 222, may communicate with the accelerator device 236 with one or more DMA transactions using the DMA engine 226 and/or with one or more MMIO transactions using the MMIO engine 228. The computing device 200 may include multiple DMA engines 226 and/or MMIO engines 228 for handling DMA and MMIO read/write transactions based on bandwidth between the processor 220 and the accelerator 236. Although illustrated as being included in the I/O subsystem 224, it should be understood that in some embodiments the DMA engine 226 and/or the MMIO engine 228 may be included in other components of the computing device 200 (e.g., the processor 220, memory controller, or system agent), or in some embodiments may be embodied as separate components.

The data storage device 232 may be embodied as any type of device or devices configured for short-term or long-term storage of data such as, for example, memory devices and circuits, memory cards, hard disk drives, solid-state drives, non-volatile flash memory, or other data storage devices. The computing device 200 may also include a communications subsystem 234, which may be embodied as any communication circuit, device, or collection thereof, capable of enabling communications between the computing device 200 and other remote devices over a computer network (not shown). The communications subsystem 234 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator device 236 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator device 236 is an FPGA, which may be embodied as an integrated circuit including programmable digital logic resources that may be configured after manufacture. The FPGA may include, for example, a configurable array of logic blocks in communication over a configurable data interchange. The accelerator device 236 may be coupled to the processor 220 via a high-speed connection interface such as a peripheral bus (e.g., a PCI Express bus) or an inter-processor interconnect (e.g., an in-die interconnect (IDI) or QuickPath Interconnect (QPI)), or via any other appropriate interconnect. The accelerator device 236 may receive data and/or commands for processing from the processor 220 and return results data to the processor 220 via DMA, MMIO, or other data transfer transactions.

As shown, the computing device 200 may further include one or more peripheral devices 238. The peripheral devices 238 may include any number of additional input/output devices, interface devices, hardware accelerators, and/or other peripheral devices. For example, in some embodiments, the peripheral devices 238 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Field Programmable Gate Arrays (FPGAs)

Figure 3:
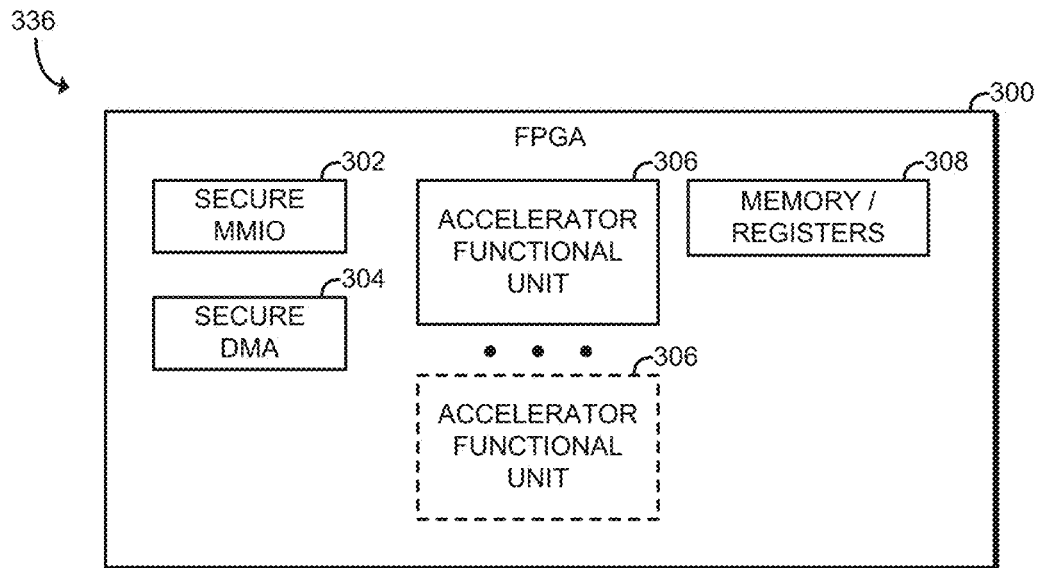
FIG. 3 is a simplified block diagram of at least one embodiment of an accelerator device of the computing device of FIG. 2.

Referring now to FIG. 3, an illustrative embodiment of a field-programmable gate array (FPGA) 300 is shown. As shown, the FPGA 300 is one potential embodiment of an accelerator device 236 described with respect to FIG. 2. The illustratively FPGA 300 includes a secure MMIO engine 302, a secure DMA engine 304, one or more accelerator functional units (AFUs) 306, and memory/registers 308. As described further below, the secure MMIO engine 302 and the secure DMA engine 304 perform in-line authenticated cryptographic operations on data transferred between the processor 220 (e.g., a secure enclave established by the processor) and the FPGA 300 (e.g., one or more AFUs 306). In some embodiments, the secure MMIO engine 302 and/or the secure DMA engine 304 may intercept, filter, or otherwise process data traffic on one or more cache-coherent interconnects, internal buses, or other interconnects of the FPGA 300.

Each AFU 306 may be embodied as logic resources of the FPGA 300 that are configured to perform an acceleration task. Each AFU 306 may be associated with an application executed by the processing system 100 in a secure enclave or other trusted execution environment. Each AFU 306 may be configured or otherwise supplied by a tenant or other user of the processing system 100. For example, each AFU 306 may correspond to a bitstream image programmed to the FPGA 300. As described further below, data processed by each AFU 306, including data exchanged with the trusted execution environment, may be cryptographically protected from untrusted components of the processing system 100 (e.g., protected from software outside of the trusted code base of the tenant enclave). Each AFU 306 may access or otherwise process stored in the memory/registers 308, which may be embodied as internal registers, cache, SRAM, storage, or other memory of the FPGA 300. In some embodiments, the memory 308 may also include external DRAM or other dedicated memory coupled to the FPGA 300.

Computing Systems and Graphics Processors

FIGS. 4A-4D illustrate computing systems and graphics processors provided by embodiments described herein. The elements of FIGS. 4A-4D having the same reference numbers (or names) as the elements of any other figure herein can operate or function in any manner similar to that described elsewhere herein, but are not limited to such.

In some implementations, a GPU is communicatively coupled to host/processor cores to accelerate, for example, graphics operations, machine-learning operations, pattern analysis operations, and/or various general-purpose GPU (GPGPU) functions. The GPU may be communicatively coupled to the host processor/cores over a bus or another interconnect (e.g., a high-speed interconnect such as PCIe or NVLink). Alternatively, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Figure 4A:
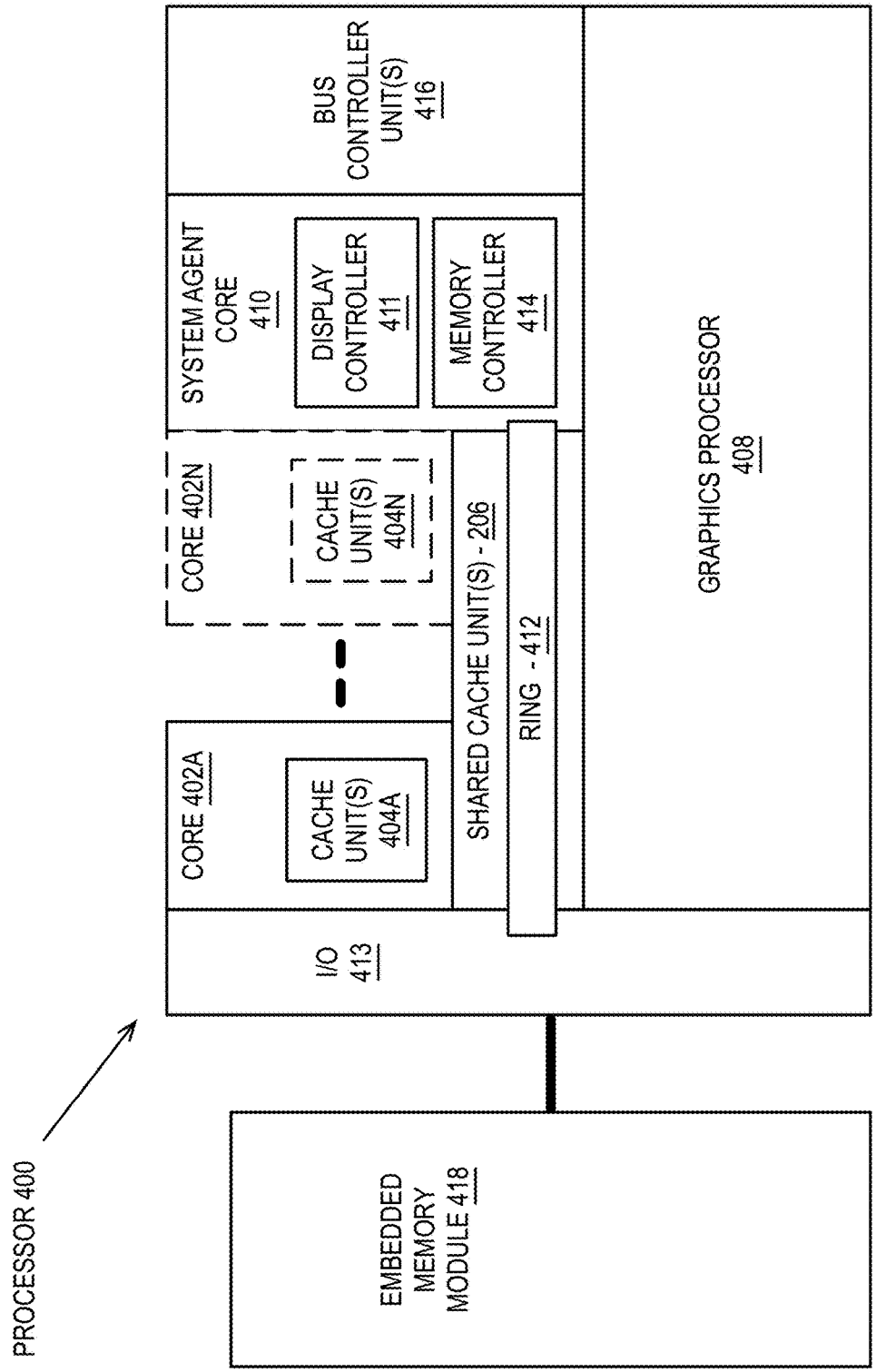
FIGS. 4A-4D illustrate computing systems and graphics processors provided by embodiments described herein.

FIG. 4A is a block diagram of an embodiment of a processor 400 having one or more processor cores 402A-

402N, an integrated memory controller 414, and an integrated graphics processor 408. Processor 400 can include additional cores up to and including additional core 402N represented by the dashed lined boxes. Each of processor cores 402A-402N includes one or more internal cache units 404A-404N. In some embodiments each processor core also has access to one or more shared cached units 406. The internal cache units 404A-404N and shared cache units 406 represent a cache memory hierarchy within the processor 400. The cache memory hierarchy may include at least one level of instruction and data cache within each processor core and one or more levels of shared mid-level cache, such as a Level 2 (L2), Level 3 (T 3), Level 4 (L4), or other levels of cache, where the highest level of cache before external memory is classified as the LLC. In some embodiments, cache coherency logic maintains coherency between the various cache units 406 and 404A-404N.

In some embodiments, processor 400 may also include a set of one or more bus controller units 416 and a system agent core 410. The one or more bus controller units 416 manage a set of peripheral buses, such as one or more PCI or PCI express busses. System agent core 410 provides management functionality for the various processor components. In some embodiments, system agent core 410 includes one or more integrated memory controllers 414 to manage access to various external memory devices (not shown).

In some embodiments, one or more of the processor cores 402A-402N include support for simultaneous multi-threading. In such embodiment, the system agent core 410 includes components for coordinating and operating cores 402A-402N during multi-threaded processing. System agent core 410 may additionally include a power control unit (PCU), which includes logic and components to regulate the power state of processor cores 402A-402N and graphics processor 408.

In some embodiments, processor 400 additionally includes graphics processor 408 to execute graphics processing operations. In some embodiments, the graphics processor 408 couples with the set of shared cache units 406, and the system agent core 410, including the one or more integrated memory controllers 414. In some embodiments, the system agent core 410 also includes a display controller 411 to drive graphics processor output to one or more coupled displays. In some embodiments, display controller 411 may also be a separate module coupled with the graphics processor via at least one interconnect, or may be integrated within the graphics processor 408.

In some embodiments, a ring-based interconnect unit 412 is used to couple the internal components of the processor 400. However, an alternative interconnect unit may be used, such as a point-to-point interconnect, a switched interconnect, or other techniques, including techniques well known in the art. In some embodiments, graphics processor 408 couples with the ring interconnect 412 via an I/O link 413.

The example I/O link 413 represents at least one of multiple varieties of I/O interconnects, including an on package I/O interconnect which facilitates communication between various processor components and a high-performance embedded memory module 418, such as an eDRAM module. In some embodiments, each of the processor cores 402A-402N and graphics processor 408 can use embedded memory modules 418 as a shared Last Level Cache.

In some embodiments, processor cores 402A-402N are homogenous cores executing the same instruction set architecture. In another embodiment, processor cores 402A-402N are heterogeneous in terms of instruction set architecture (ISA), where one or more of processor cores 402A-402N execute a first instruction set, while at least one of the other cores executes a subset of the first instruction set or a different instruction set. In one embodiment, processor cores 402A-402N are heterogeneous in terms of microarchitecture, where one or more cores having a relatively higher power consumption couple with one or more power cores having a lower power consumption. In one embodiment, processor cores 402A-402N are heterogeneous in terms of computational capability. Additionally, processor 400 can be implemented on one or more chips or as an SoC integrated circuit having the illustrated components, in addition to other components.

Figure 4B:
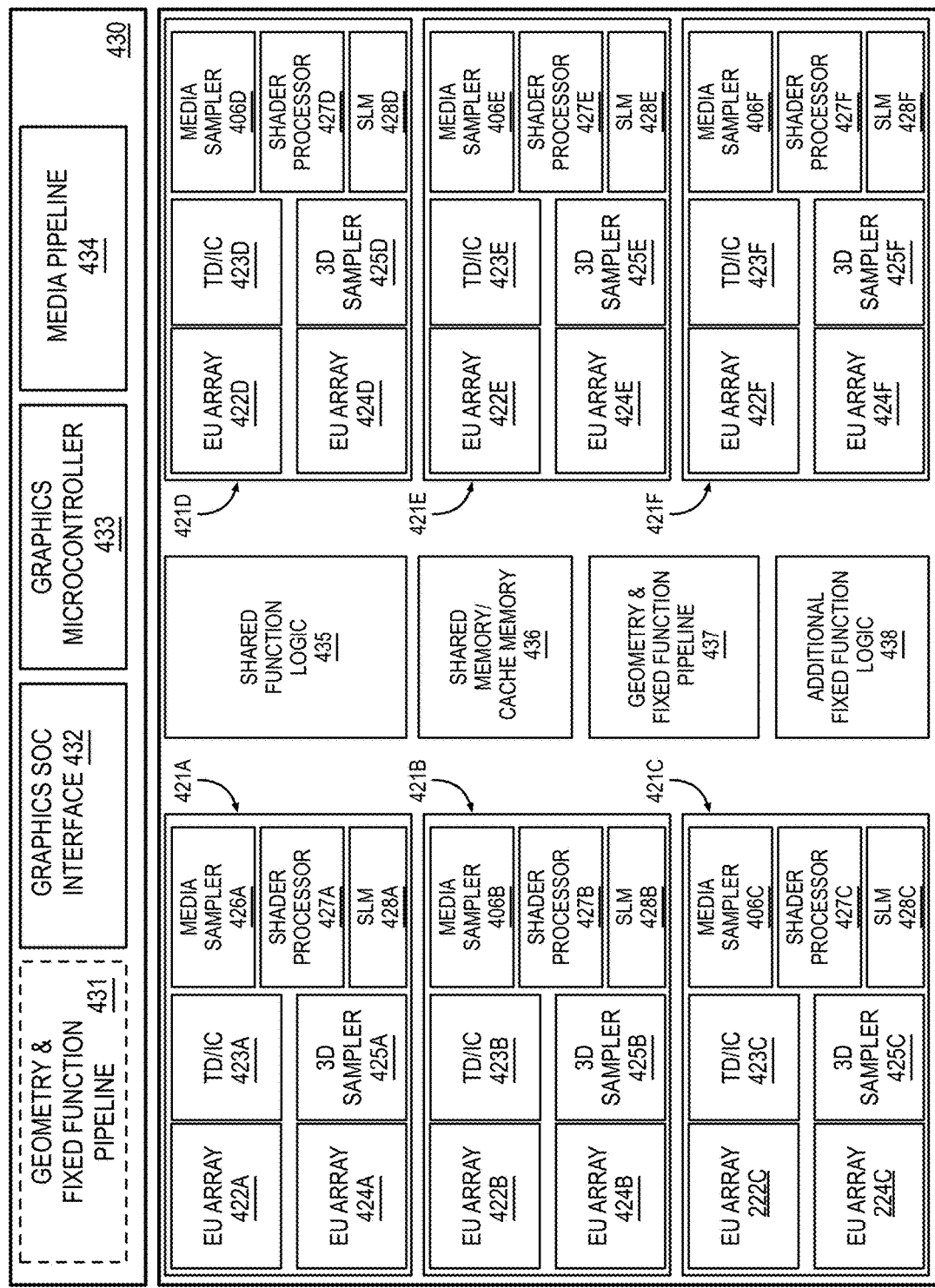

FIG. 4B is a block diagram of hardware logic of a graphics processor core 419, according to some embodiments described herein. Elements of FIG. 4B having the same reference numbers (or names) as the elements of any other figure herein can operate or function in any manner similar to that described elsewhere herein, but are not limited to such. The graphics processor core 419, sometimes referred to as a core slice, can be one or multiple graphics cores within a modular graphics processor. The graphics processor core 419 is an example of one graphics core slice, and a graphics processor as described herein may include multiple graphics core slices based on target power and performance envelopes. Each graphics processor core 419 can include a fixed function block 430 coupled with multiple sub-cores 421A-421F, also referred to as sub-slices, that include modular blocks of general-purpose and fixed function logic.

In some embodiments, the fixed function block 430 includes a geometry/fixed function pipeline 431 that can be shared by all sub-cores in the graphics processor core 419, for example, in lower performance and/or lower power graphics processor implementations. In various embodiments, the geometry/fixed function pipeline 431 includes a 3D fixed function, a video front-end unit, a thread spawner and thread dispatcher, and a unified return buffer manager, which manages unified return buffers.

In one embodiment the fixed function block 430 also includes a graphics SoC interface 432, a graphics microcontroller 433, and a media pipeline 434. The graphics SoC interface 432 provides an interface between the graphics processor core 419 and other processor cores within a system on a chip integrated circuit. The graphics microcontroller 433 is a programmable sub-processor that is configurable to manage various functions of the graphics processor core 419, including thread dispatch, scheduling, and preemption. The media pipeline 434 includes logic to facilitate the decoding, encoding, pre-processing, and/or post-processing of multimedia data, including image and video data. The media pipeline 434 implement media operations via requests to compute or sampling logic within the sub-cores 421-421F.

In one embodiment the SoC interface 432 enables the graphics processor core 419 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 432 can also enable communication with fixed function devices within the SoC, such as camera imaging pipelines, and enables the use of and/or implements global memory atomics that may be shared between the graphics processor core 419 and CPUs within the SoC. The SoC interface 432 can also implement power management controls for the graphics processor core 419 and enable an interface between a clock domain of the graphic core 419 and other clock domains within the SoC. In one embodiment the SoC interface 432 enables receipt of command buffers from a command streamer and global thread dispatcher that are configured to provide commands and instructions to each of one or more graphics cores within a graphics processor. The commands and instructions can be dispatched to the media pipeline 434, when media operations are to be performed, or a geometry and fixed function pipeline (e.g., geometry and fixed function pipeline 431, geometry and fixed function pipeline 437) when graphics processing operations are to be performed.

The graphics microcontroller 433 can be configured to perform various scheduling and management tasks for the graphics processor core 419. In one embodiment the graphics microcontroller 433 can perform graphics and/or compute workload scheduling on the various graphics parallel engines within execution unit (EU) arrays 422A-422F, 424A-424F within the sub-cores 421A-421F. In this scheduling model, host software executing on a CPU core of an SoC including the graphics processor core 419 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 433 can also facilitate low-power or idle states for the graphics processor core 419, providing the graphics processor core 419 with the ability to save and restore registers within the graphics processor core 419 across low-power state transitions independently from the operating system and/or graphics driver software on the system.

The graphics processor core 419 may have greater than or fewer than the illustrated sub-cores 421A-421F, up to N modular sub-cores. For each set of N sub-cores, the graphics processor core 419 can also include shared function logic 435, shared and/or cache memory 436, a geometry/fixed function pipeline 437, as well as additional fixed function logic 438 to accelerate various graphics and compute processing operations. The shared function logic 435 can include logic units associated with the shared function logic (e.g., sampler, math, and/or inter-thread communication logic) that can be shared by each N sub-cores within the graphics processor core 419. The shared and/or cache memory 436 can be a last-level cache for the set of N sub-cores 421A-421F within the graphics processor core 419, and can also serve as shared memory that is accessible by multiple sub-cores. The geometry/fixed function pipeline 437 can be included instead of the geometry/fixed function pipeline 431 within the fixed function block 430 and can include the same or similar logic units.

In one embodiment the graphics processor core 419 includes additional fixed function logic 438 that can include various fixed function acceleration logic for use by the graphics processor core 419. In one embodiment the additional fixed function logic 438 includes an additional geometry pipeline for use in position-only shading. In position-only shading, two geometry pipelines exist, the full geometry pipeline within the geometry/fixed function pipeline 438, 431, and a cull pipeline, which is an additional geometry pipeline which may be included within the additional fixed function logic 438. In one embodiment the cull pipeline is a trimmed down version of the full geometry pipeline. The full pipeline and the cull pipeline can execute different instances of the same application, each instance having a separate context. Position-only shading can hide long cull runs of discarded triangles, enabling shading to be completed earlier in some instances. For example, and in one embodiment, the cull pipeline logic within the additional fixed function logic 438 can execute position shaders in parallel with the main application and generally generates results faster than the full pipeline, as the cull pipeline fetches and shades the position attribute of the vertices, without performing rasterization and rendering of the pixels to the frame buffer. The cull pipeline can use the generated results to compute visibility information for all the triangles without regard to whether those triangles are culled. The full pipeline (which in this instance may be referred to as a replay pipeline) can consume the visibility information to skip the culled triangles to shade the visible triangles that are finally passed to the rasterization phase.

In one embodiment the additional fixed function logic 438 can also include machine-learning acceleration logic, such as fixed function matrix multiplication logic, for implementations including optimizations for machine learning training or inferencing.

Within each graphics sub-core 421A-421F includes a set of execution resources that may be used to perform graphics, media, and compute operations in response to requests by graphics pipeline, media pipeline, or shader programs. The graphics sub-cores 421A-421F include multiple EU arrays 422A-422F, 424A-424F, thread dispatch and inter-thread communication (TD/IC) logic 423A-423F, a 3D (e.g., texture) sampler 425A-425F, a media sampler 406A-406F, a shader processor 427A-427F, and shared local memory (SLM) 428A-428F. The EU arrays 422A-422F, 424A-424F each include multiple execution units, which are general-purpose graphics processing units capable of performing floating-point and integer/fixed-point logic operations in service of a graphics, media, or compute operation, including graphics, media, or compute shader programs. The TD/IC logic 423A-423F performs local thread dispatch and thread control operations for the execution units within a sub-core and facilitate communication between threads executing on the execution units of the sub-core. The 3D sampler 425A-425F can read texture or other 3D graphics related data into memory. The 3D sampler can read texture data differently based on a configured sample state and the texture format associated with a given texture. The media sampler 406A-406F can perform similar read operations based on the type and format associated with media data. In one embodiment, each graphics sub-core 421A-421F can alternately include a unified 3D and media sampler. Threads executing on the execution units within each of the sub-cores 421A-421F can make use of shared local memory 428A-428F within each sub-core, to enable threads executing within a thread group to execute using a common pool of on-chip memory.

Figure 4C:
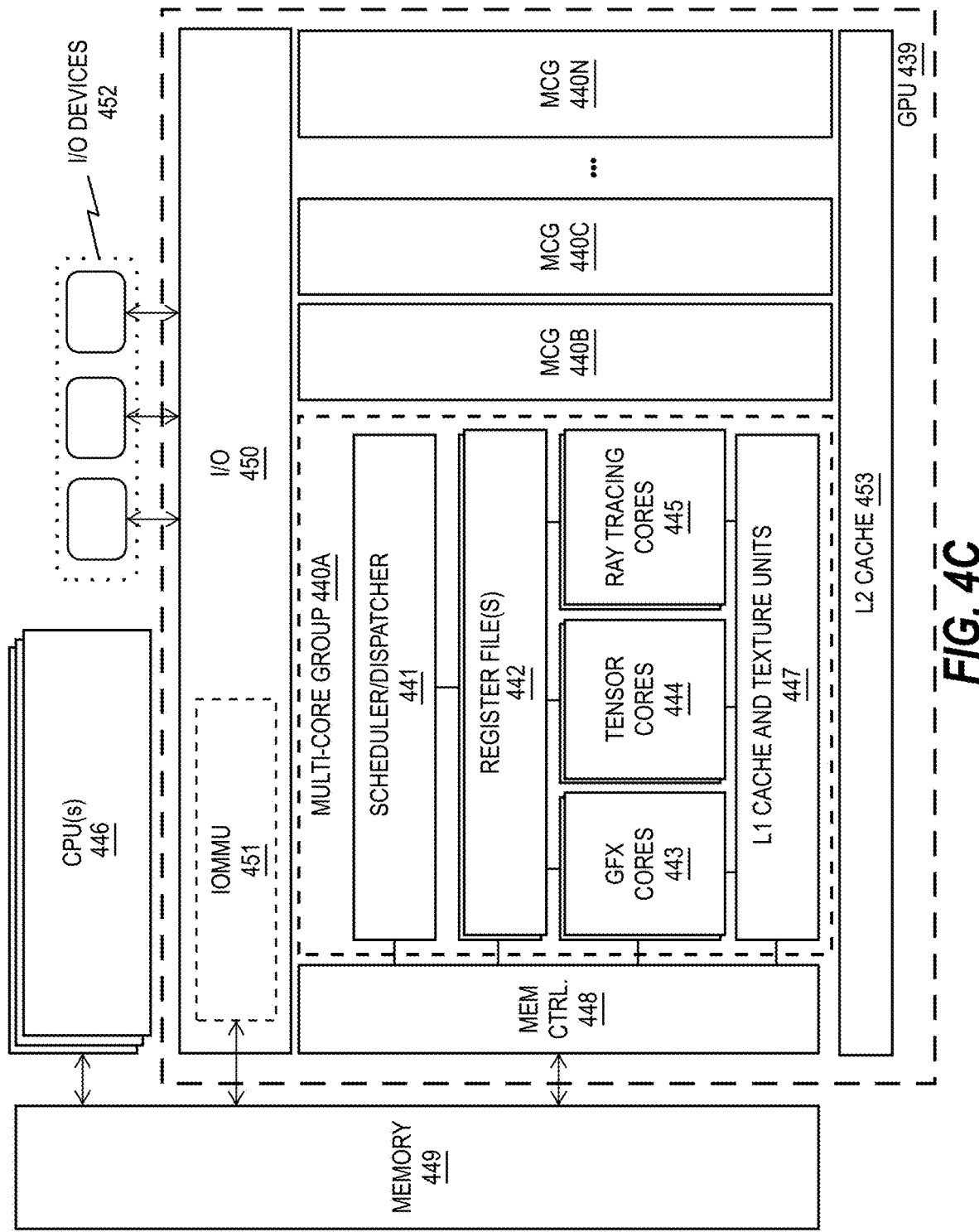

FIG. 4C illustrates a graphics processing unit (GPU) 439 that includes dedicated sets of graphics processing resources arranged into multi-core groups 440A-440N. While the details of a single multi-core group 440A are provided, it may be appreciated that the other multi-core groups 440B-440N may be equipped with the same or similar sets of graphics processing resources.

As illustrated, a multi-core group 440A may include a set of graphics cores 443, a set of tensor cores 444, and a set of ray tracing cores 445. A scheduler/dispatcher 441 schedules and dispatches the graphics threads for execution on the various cores 443, 444, 445. A set of register files 442 store operand values used by the cores 443, 444, 445 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 447 store graphics data such as texture data, vertex data, pixel data, ray data, bounding volume data, etc., locally within each multi-core group 440A. One or more texture units 447 can also be used to perform texturing operations, such as texture mapping and sampling. A Level 2 (L2) cache 453 shared by all or a subset of the multi-core groups 440A-440N stores graphics data and/or instructions for multiple concurrent graphics threads. As illustrated, the L2 cache 453 may be shared across a plurality of multi-core groups 440A-440N. One or more memory controllers 448 couple the GPU 439 to a memory 449 which may be a system memory (e.g., DRAM) and/or a dedicated graphics memory (e.g., GDDR6 memory).

Input/output (I/O) circuitry 450 couples the GPU 439 to one or more I/O devices 452 such as digital signal processors (DSPs), network controllers, or user input devices. An on-chip interconnect may be used to couple the I/O devices 454 to the GPU 439 and memory 449. One or more I/O memory management units (IOMMUs) 451 of the I/O circuitry 450 couple the I/O devices 452 directly to the system memory 449. In one embodiment, the IOMMU 451 manages multiple sets of page tables to map virtual addresses to physical addresses in system memory 449. In this embodiment, the I/O devices 452, CPU(s) 446, and GPU(s) 439 may share the same virtual address space.

In one implementation, the IOMMU 451 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 449). The base addresses of each of the first and second sets of page tables may be stored in control registers and swapped out on a context switch (e.g., so that the new context is provided with access to the relevant set of page tables). While not illustrated in FIG. 4C, each of the cores 443, 444, 445 and/or multi-core groups 440A-440N may include translation lookaside buffers (TLBs) to cache guest virtual to guest physical translations, guest physical to host physical translations, and guest virtual to host physical translations.

In one embodiment, the CPUs 446, GPUs 439, and I/O devices 452 are integrated on a single semiconductor chip and/or chip package. The illustrated memory 449 may be integrated on the same chip or may be coupled to the memory controllers 448 via an off-chip interface. In one implementation, the memory 449 comprises GDDR6 memory which shares the same virtual address space as other physical system-level memories, although the underlying principles of implementations herein are not limited to this specific implementation.

In one embodiment, the tensor cores 444 include a plurality of execution units specifically designed to perform matrix operations, which are the compute operations used to perform deep learning operations. For example, simultaneous matrix multiplication operations may be used for neural network training and inferencing. The tensor cores 444 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 444. The training of neural networks, in particular, utilizes a significant number matrix dot product operations. In order to process an inner-product formulation of an N×N×N matrix multiply, the tensor cores 444 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 444 to ensure that the most efficient precision is used for different workloads (e.g., such as inferencing workloads which can tolerate quantization to bytes and half-bytes).

In one embodiment, the ray tracing cores 445 accelerate ray tracing operations for both real-time ray tracing and non-real-time ray tracing implementations. In particular, the ray tracing cores 445 include ray traversal/intersection circuitry for performing ray traversal using bounding volume hierarchies (BVHs) and identifying intersections between rays and primitives enclosed within the BVH volumes. The ray tracing cores 445 may also include circuitry for performing depth testing and culling (e.g., using a Z buffer or similar arrangement). In one implementation, the ray tracing cores 445 perform traversal and intersection operations in concert with the image denoising techniques described herein, at least a portion of which may be executed on the tensor cores 444. For example, in one embodiment, the tensor cores 444 implement a deep learning neural network to perform denoising of frames generated by the ray tracing cores 445. However, the CPU(s) 446, graphics cores 443, and/or ray tracing cores 445 may also implement all or a portion of the denoising and/or deep learning algorithms.

In addition, as described above, a distributed approach to denoising may be employed in which the GPU 439 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 445 process all BVH traversal and ray-primitive intersections, saving the graphics cores 443 from being overloaded with thousands of instructions per ray. In one embodiment, each ray tracing core 445 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 440A can simply launch a ray probe, and the ray tracing cores 445 independently perform ray traversal and intersection and return hit data (e.g., a hit, no hit, multiple hits, etc.) to the thread context. The other cores 443, 444 are freed to perform other graphics or compute work while the ray tracing cores 445 perform the traversal and intersection operations.

In one embodiment, each ray tracing core 445 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 443 and tensor cores 444) are freed to perform other forms of graphics work.

In one particular embodiment described below, a hybrid rasterization/ray tracing approach is used in which work is distributed between the graphics cores 443 and ray tracing cores 445.

In one embodiment, the ray tracing cores 445 (and/or other cores 443, 444) include hardware support for a ray tracing instruction set such as Microsoft's DirectX Ray Tracing (DXR) which includes a DispatchRays command, as well as ray-generation, closest-hit, any-hit, and miss shaders, which enable the assignment of sets of shaders and textures for each object. Another ray tracing platform which may be supported by the ray tracing cores 445, graphics cores 443 and tensor cores 444 is Vulkan 1.1.85. Note, however, that the underlying principles of implementations herein are not limited to any particular ray tracing ISA.

In general, the various cores 445, 444, 443 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray can traverse.

Exceptions—Includes various types of exception handlers (e.g., invoked for various error conditions).

Figure 4D:
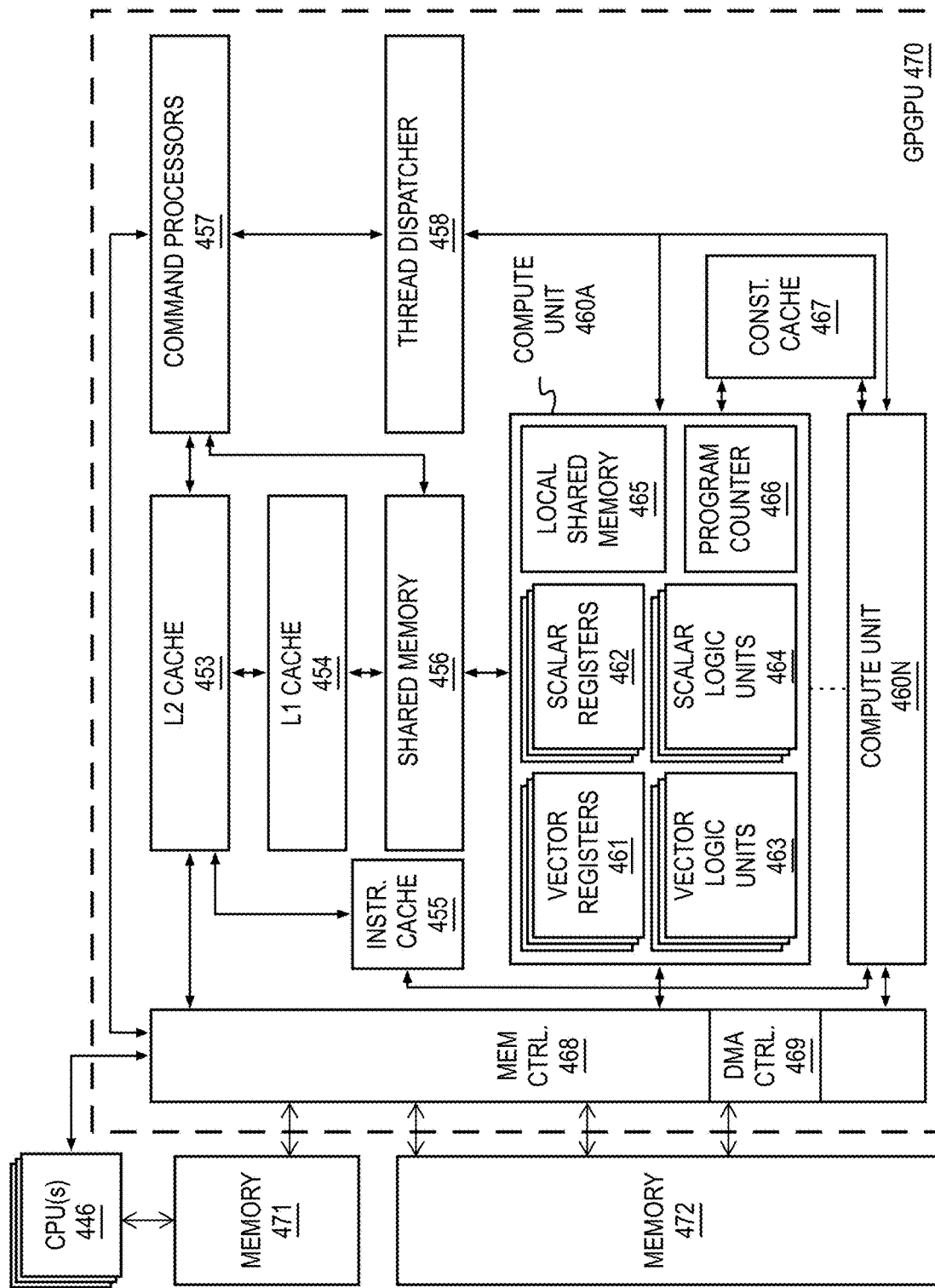

FIG. 4D is a block diagram of general purpose graphics processing unit (GPGPU) 470 that can be configured as a graphics processor and/or compute accelerator, according to embodiments described herein. The GPGPU 470 can interconnect with host processors (e.g., one or more CPU(s) 446) and memory 471, 472 via one or more system and/or memory busses. In one embodiment the memory 471 is system memory that may be shared with the one or more CPU(s) 446, while memory 472 is device memory that is dedicated to the GPGPU 470. In one embodiment, components within the GPGPU 470 and device memory 472 may be mapped into memory addresses that are accessible to the one or more CPU(s) 446. Access to memory 471 and 472 may be facilitated via a memory controller 468. In one embodiment the memory controller 468 includes an internal direct memory access (DMA) controller 469 or can include logic to perform operations that would otherwise be performed by a DMA controller.

The GPGPU 470 includes multiple cache memories, including an L2 cache 453, L1 cache 454, an instruction cache 455, and shared memory 456, at least a portion of which may also be partitioned as a cache memory. The GPGPU 470 also includes multiple compute units 460A-460N. Each compute unit 460A-460N includes a set of vector registers 461, scalar registers 462, vector logic units 463, and scalar logic units 464. The compute units 460A-460N can also include local shared memory 465 and a program counter 466. The compute units 460A-460N can couple with a constant cache 467, which can be used to store constant data, which is data that may not change during the run of kernel or shader program that executes on the GPGPU 470. In one embodiment the constant cache 467 is a scalar data cache and cached data can be fetched directly into the scalar registers 462.

During operation, the one or more CPU(s) 446 can write commands into registers or memory in the GPGPU 470 that has been mapped into an accessible address space. The command processors 457 can read the commands from registers or memory and determine how those commands can be processed within the GPGPU 470. A thread dispatcher 458 can then be used to dispatch threads to the compute units 460A-460N to perform those commands. Each compute unit 460A-460N can execute threads independently of the other compute units. Additionally, each compute unit 460A-460N can be independently configured for conditional computation and can conditionally output the results of computation to memory. The command processors 457 can interrupt the one or more CPU(s) 446 when the submitted commands are complete.

Graphics Software Architecture

Figure 5:
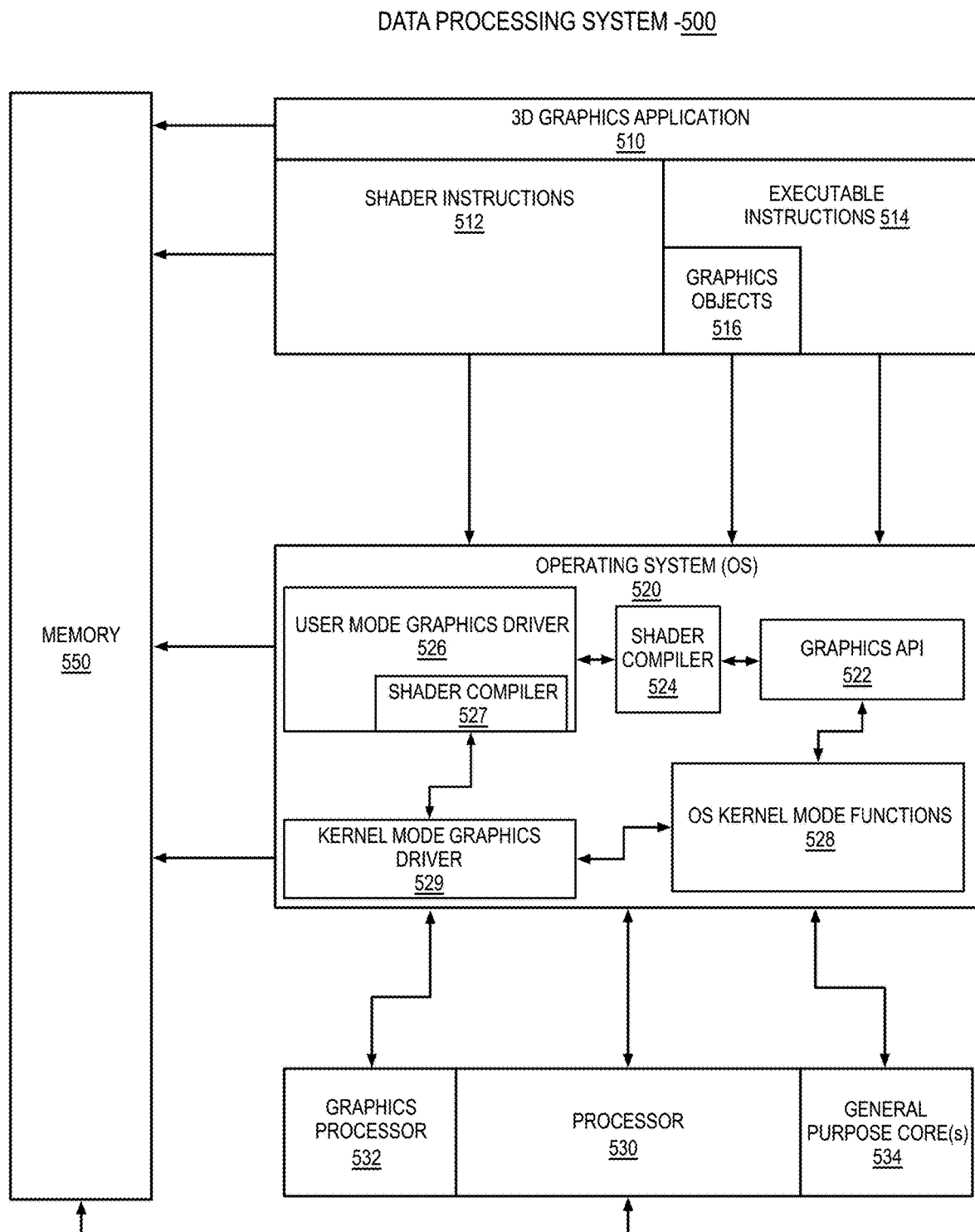
FIG. 5 illustrates example graphics software architecture for a data processing system in accordance with some embodiments.

FIG. 5 illustrates an example graphics software architecture for a data processing system 500 according to some embodiments. In some embodiments, software architecture includes a 3D graphics application 510, an operating system 520, and at least one processor 530. In some embodiments, processor 530 includes a graphics processor 532 and one or more general-purpose processor core(s) 534. The graphics application 510 and operating system 520 each execute in the system memory 550 of the data processing system.

In some embodiments, 3D graphics application 510 contains one or more shader programs including shader instructions 512. The shader language instructions may be in a high-level shader language, such as the High-Level Shader Language (HLSL) of Direct3D, the OpenGL Shader Language (GLSL), and so forth. The application also includes executable instructions 514 in a machine language suitable for execution by the general-purpose processor core 534. The application also includes graphics objects 516 defined by vertex data.

In some embodiments, operating system 520 is a Microsoft® Windows® operating system from the Microsoft Corporation, a proprietary UNIX-like operating system, or an open source UNIX-like operating system using a variant of the Linux kernel. The operating system 520 can support a graphics API 522 such as the Direct3D API, the OpenGL API, or the Vulkan API. When the Direct3D API is in use, the operating system 520 uses a front-end shader compiler 524 to compile any shader instructions 512 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 510. In some embodiments, the shader instructions 512 are provided in an intermediate form, such as a version of the Standard Portable Intermediate Representation (SPIR) used by the Vulkan API.

In some embodiments, user mode graphics driver 526 contains a back-end shader compiler 527 to convert the shader instructions 512 into a hardware specific representation. When the OpenGL API is in use, shader instructions 512 in the GLSL high-level language are passed to a user mode graphics driver 526 for compilation. In some embodiments, user mode graphics driver 526 uses operating system kernel mode functions 528 to communicate with a kernel mode graphics driver 529. In some embodiments, kernel mode graphics driver 529 communicates with graphics processor 532 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 6A:
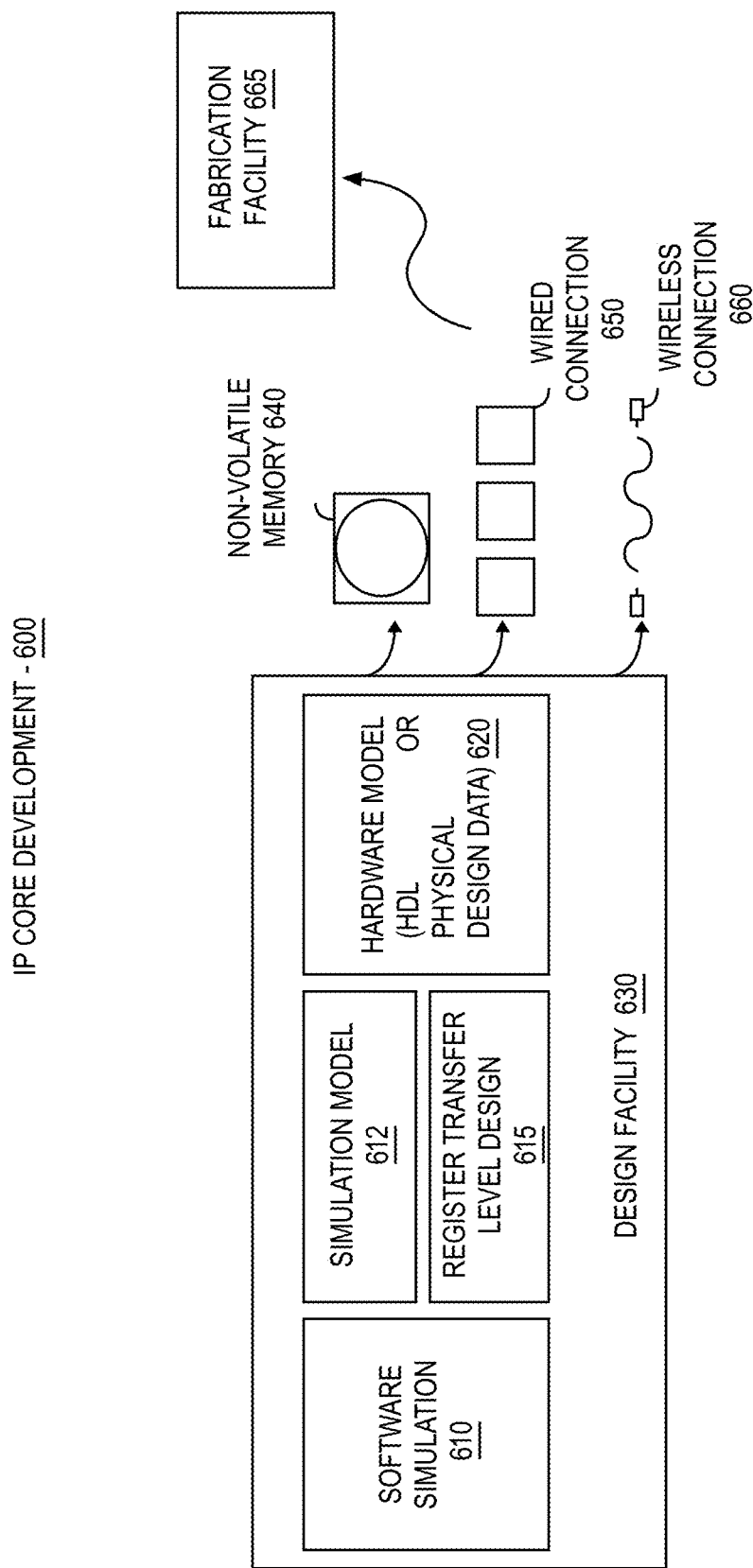
FIG. 6A is a block diagram illustrating an IP core development system in accordance with some embodiments.

FIG. 6A is a block diagram illustrating an IP core development system 600 that may be used to manufacture an integrated circuit to perform operations according to an embodiment. The IP core development system 600 may be used to generate modular, re-usable designs that can be incorporated into a larger design or used to construct an entire integrated circuit (e.g., an SOC integrated circuit). A design facility 630 can generate a software simulation 610 of an IP core design in a high-level programming language (e.g., C/C++). The software simulation 610 can be used to design, test, and verify the behavior of the IP core using a simulation model 612. The simulation model 612 may include functional, behavioral, and/or timing simulations. A register transfer level (RTL) design 615 can then be created or synthesized from the simulation model 612. The RTL design 615 is an abstraction of the behavior of the integrated circuit that models the flow of digital signals between hardware registers, including the associated logic performed using the modeled digital signals. In addition to an RTL design 615, lower-level designs at the logic level or transistor level may also be created, designed, or synthesized. Thus, the particular details of the initial design and simulation may vary.

The RTL design 615 or equivalent may be further synthesized by the design facility into a hardware model 620, which may be in a hardware description language (HDL), or some other representation of physical design data. The HDL may be further simulated or tested to verify the IP core design. The IP core design can be stored for delivery to a 3$^{rd}$ party fabrication facility 665 using non-volatile memory 640 (e.g., hard disk, flash memory, or any non-volatile storage medium). Alternatively, the IP core design may be transmitted (e.g., via the Internet) over a wired connection 650 or wireless connection 660. The fabrication facility 665 may then fabricate an integrated circuit that is based at least in part on the IP core design. The fabricated integrated circuit can be configured to perform operations in accordance with at least one embodiment described herein.

Figure 6B:
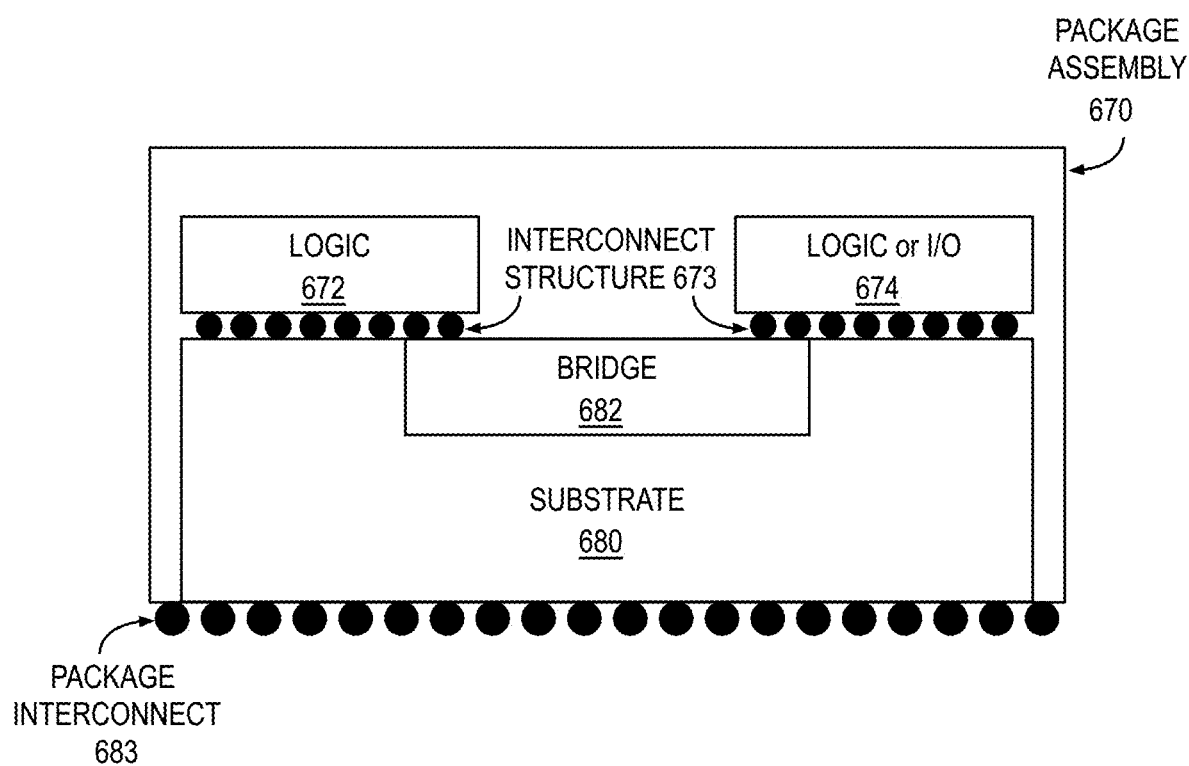
FIG. 6B illustrates a cross-section side view of an integrated circuit package assembly in accordance with some embodiments.

FIG. 6B illustrates a cross-section side view of an integrated circuit package assembly 670, according to some embodiments described herein. The integrated circuit package assembly 670 illustrates an implementation of one or more processor or accelerator devices as described herein. The package assembly 670 includes multiple units of hardware logic 672, 674 connected to a substrate 680. The logic 672, 674 may be implemented at least partly in configurable logic or fixed-functionality logic hardware, and can include one or more portions of any of the processor core(s), graphics processor(s), or other accelerator devices described herein. Each unit of logic 672, 674 can be implemented within a semiconductor die and coupled with the substrate 680 via an interconnect structure 673. The interconnect structure 673 may be configured to route electrical signals between the logic 672, 674 and the substrate 680, and can include interconnects such as, but not limited to bumps or pillars. In some embodiments, the interconnect structure 673 may be configured to route electrical signals such as, for example, input/output (I/O) signals and/or power or ground signals associated with the operation of the logic 672, 674. In some embodiments, the substrate 680 is an epoxy-based laminate substrate. The substrate 680 may include other suitable types of substrates in other embodiments. The package assembly 670 can be connected to other electrical devices via a package interconnect 683. The package interconnect 683 may be coupled to a surface of the substrate 680 to route electrical signals to other electrical devices, such as a motherboard, other chipset, or multi-chip module.

In some embodiments, the units of logic 672, 674 are electrically coupled with a bridge 682 that is configured to route electrical signals between the logic 672, 674. The bridge 682 may be a dense interconnect structure that provides a route for electrical signals. The bridge 682 may include a bridge substrate composed of glass or a suitable semiconductor material. Electrical routing features can be formed on the bridge substrate to provide a chip-to-chip connection between the logic 672, 674.

Although two units of logic 672, 674 and a bridge 682 are illustrated, embodiments described herein may include more or fewer logic units on one or more dies. The one or more dies may be connected by zero or more bridges, as the bridge 682 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 6C:
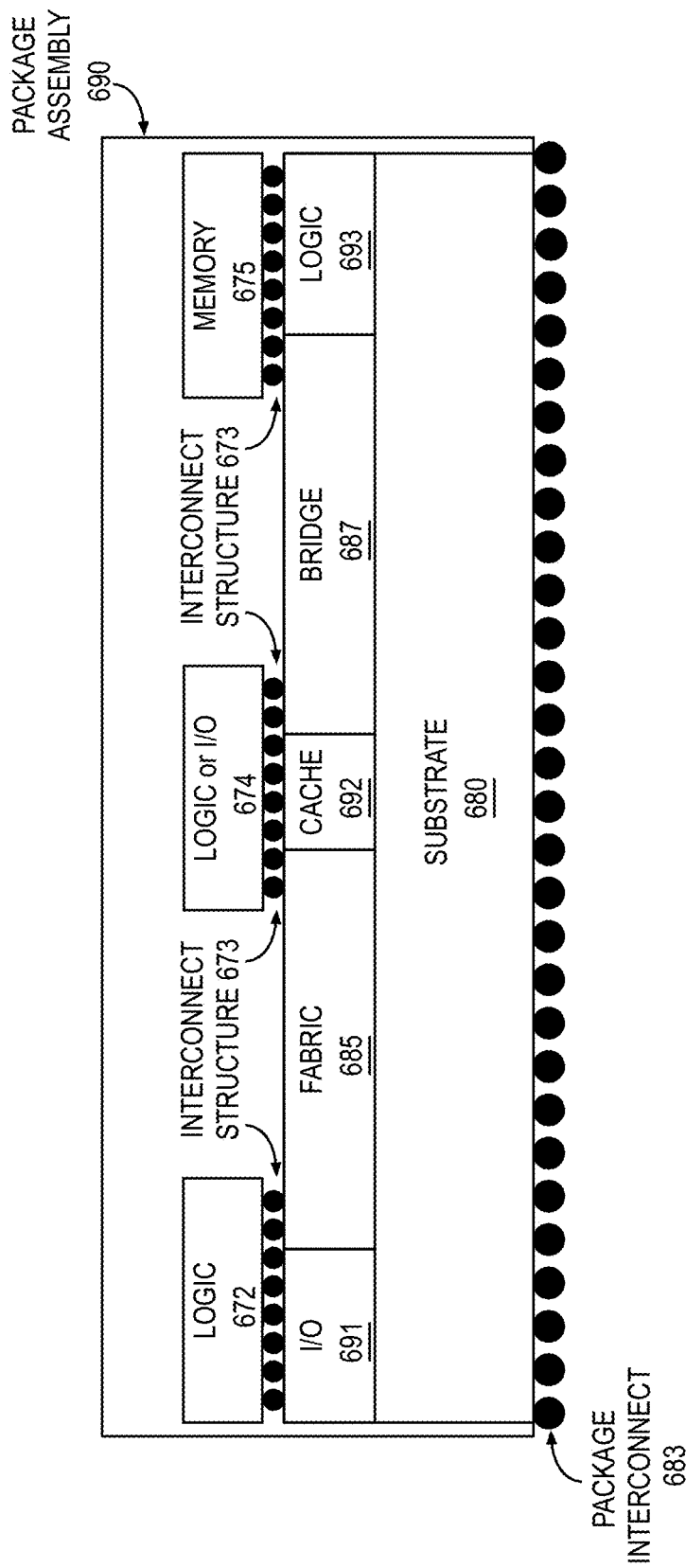
FIG. 6C illustrates a package assembly that includes multiple units of hardware logic chiplets connected to a substrate (e.g., base die) in accordance with some embodiments.

FIG. 6C illustrates a package assembly 690 that includes multiple units of hardware logic chiplets connected to a substrate 680 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 672, logic or I/O chiplets 674, and/or memory chiplets 675. The hardware logic chiplets 672 and logic or I/O chiplets 674 may be implemented at least partly in configurable logic or fixed-functionality logic hardware and can include one or more portions of any of the processor core(s), graphics processor(s), parallel processors, or other accelerator devices described herein. The memory chiplets 675 can be DRAM (e.g., GDDR, HBM) memory or cache (SRAM) memory.

Each chiplet can be fabricated as separate semiconductor die and coupled with the substrate 680 via an interconnect structure 673. The interconnect structure 673 may be configured to route electrical signals between the various chiplets and logic within the substrate 680. The interconnect structure 673 can include interconnects such as, but not limited to bumps or pillars. In some embodiments, the interconnect structure 673 may be configured to route electrical signals such as, for example, input/output (I/O) signals and/or power or ground signals associated with the operation of the logic, I/O and memory chiplets.

In some embodiments, the substrate 680 is an epoxy-based laminate substrate. The substrate 680 may include other suitable types of substrates in other embodiments. The package assembly 690 can be connected to other electrical devices via a package interconnect 683. The package interconnect 683 may be coupled to a surface of the substrate 680 to route electrical signals to other electrical devices, such as a motherboard, other chipset, or multi-chip module.

In some embodiments, a logic or I/O chiplet 674 and a memory chiplet 675 can be electrically coupled via a bridge 687 that is configured to route electrical signals between the logic or I/O chiplet 674 and a memory chiplet 675. The bridge 687 may be a dense interconnect structure that provides a route for electrical signals. The bridge 687 may include a bridge substrate composed of glass or a suitable semiconductor material. Electrical routing features can be formed on the bridge substrate to provide a chip-to-chip connection between the logic or I/O chiplet 674 and a memory chiplet 675. The bridge 687 may also be referred to as a silicon bridge or an interconnect bridge. For example, the bridge 687, in some embodiments, is an Embedded Multi-die Interconnect Bridge (EMIB). In some embodiments, the bridge 687 may simply be a direct connection from one chiplet to another chiplet.

The substrate 680 can include hardware components for I/O 691, cache memory 692, and other hardware logic 693. A fabric 685 can be embedded in the substrate 680 to enable communication between the various logic chiplets and the logic 691, 693 within the substrate 680. In one embodiment, the I/O 691, fabric 685, cache, bridge, and other hardware logic 693 can be integrated into a base die that is layered on top of the substrate 680. The fabric 685 may be a network on a chip interconnect or another form of packet switched fabric that switches data packets between components of the package assembly.

In various embodiments a package assembly 690 can include fewer or greater number of components and chiplets that are interconnected by a fabric 685 or one or more bridges 687. The chiplets within the package assembly 690 may be arranged in a 3D or 2.5D arrangement. In general, bridge structures 687 may be used to facilitate a point to point interconnect between, for example, logic or I/O chiplets and memory chiplets. The fabric 685 can be used to interconnect the various logic and/or I/O chiplets (e.g., chiplets 672, 674, 691, 693). with other logic and/or I/O chiplets. In one embodiment, the cache memory 692 within the substrate can act as a global cache for the package assembly 690, part of a distributed global cache, or as a dedicated cache for the fabric 685.

Figure 6D:
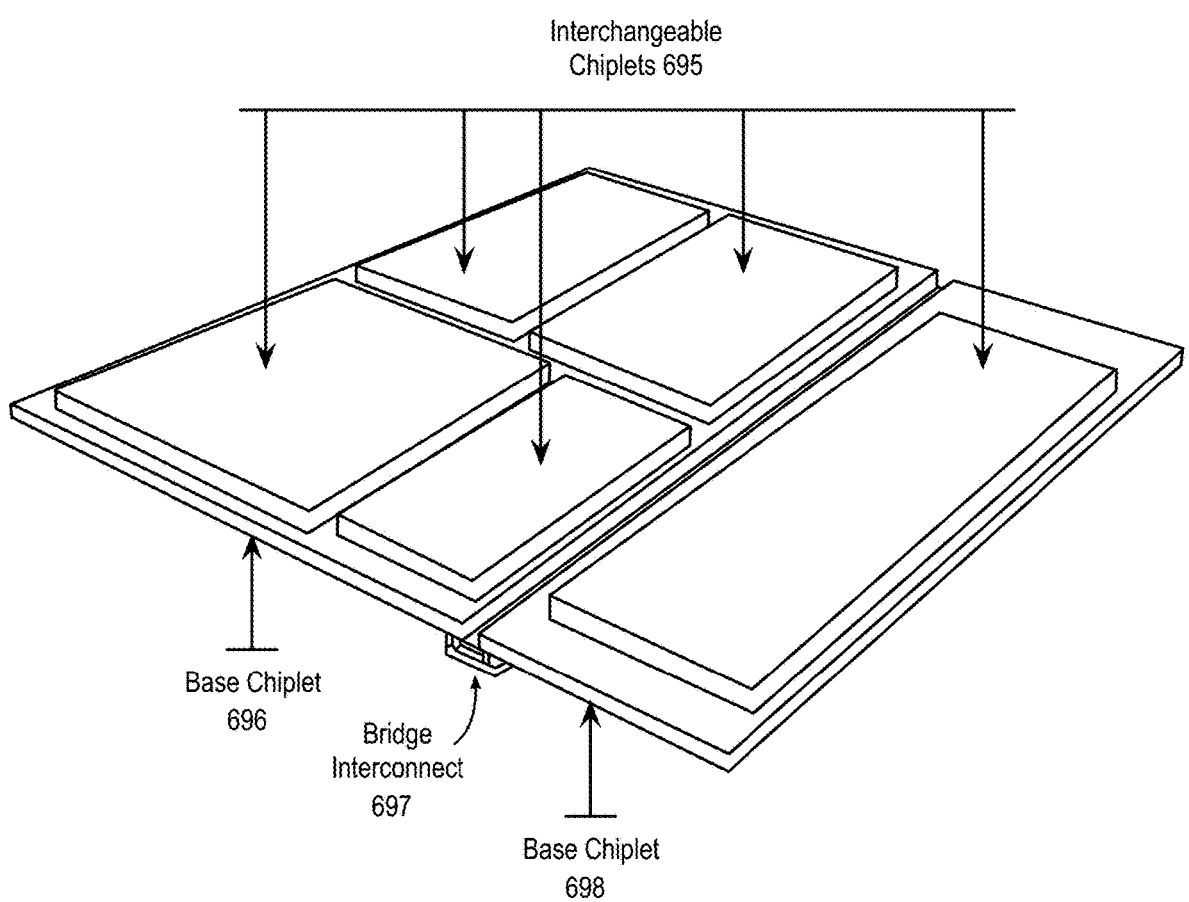
FIG. 6D illustrates a package assembly including interchangeable chiplets in accordance with some embodiments.

FIG. 6D illustrates a package assembly 694 including interchangeable chiplets 695, according to an embodiment. The interchangeable chiplets 695 can be assembled into standardized slots on one or more base chiplets 696, 698. The base chiplets 696, 698 can be coupled via a bridge interconnect 697, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 696, 698, which can be fabricated using a different process technology relative to the interchangeable chiplets 695 that are stacked on top of the base chiplets. For example, the base chiplets 696, 698 can be fabricated using a larger process technology, while the interchangeable chiplets can be manufactured using a smaller process technology. One or more of the interchangeable chiplets 695 may be memory (e.g., DRAM) chiplets. Different memory densities can be selected for the package assembly 694 based on the power, and/or performance targeted for the product that uses the package assembly 694. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Example System on a Chip Integrated Circuit

Figure 7:
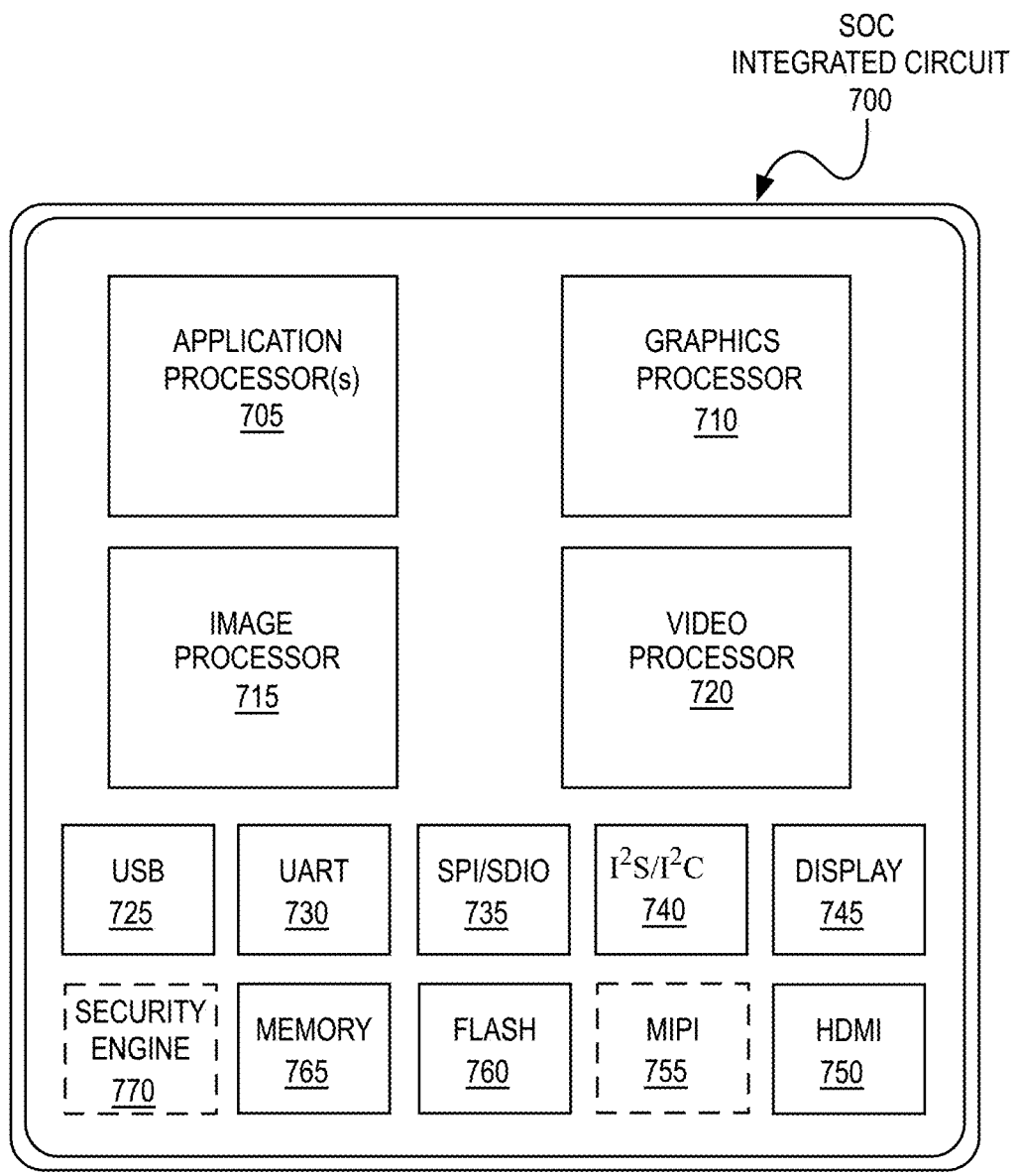
FIG. 7 is a block diagram illustrating an example system on a chip integrated circuit in accordance with some embodiments.

FIG. 7 illustrates an example integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 7 is a block diagram illustrating an example system on a chip integrated circuit 700 that may be fabricated using one or more IP cores, according to an embodiment. Example integrated circuit 700 includes one or more application processor(s) 705 (e.g., CPUs), at least one graphics processor 710, and may additionally include an image processor 715 and/or a video processor 720, any of which may be a modular IP core from the same or multiple different design facilities. Integrated circuit 700 includes peripheral or bus logic including a USB controller 725, UART controller 730, an SPI/SDIO controller 735, and an I²S/I²C controller 740.

Additionally, the integrated circuit can include a display device 745 coupled to one or more of a high-definition multimedia interface (HDMI) controller 750 and a mobile industry processor interface (MIPI) display interface 755. Storage may be provided by a flash memory subsystem 760 including flash memory and a flash memory controller. Memory interface may be provided via a memory controller 765 for access to SDRAM or SRAM memory devices. Some integrated circuits additionally include an embedded security engine 770.

In-Place Memory Copy During Remote Data Transfer in A Heterogeneous Compute Environment As previously described, confidential computing enables users to maintain confidentiality and integrity of their data and code in the presence of software and hardware exploits on the platform where the users are running their application. One way this is enabled is through use of (TEE) technologies, such as Intel® SGX, AMD® SEV and Intel® TDX, that provide hardware-enforced isolation to application code and data during execution.

Massive compute needs of applications, such as AI/ML and data analytics, have made computing heterogeneous. Heterogeneous computing refers to a compute environment where parts of an application are accelerated on one or more hardware accelerator, such as GPUs, FPGAs, or purpose-built ASICs, to name a few examples. The portion of workload offloaded to an accelerator is known as a compute kernel. Offloading a workload to from one type of computing component to another type of computing compute may be referred to as heterogeneous compute.

For confidential computing solutions, data may be encrypted and integrity-protected during memory copy to prevent software and/or network adversaries from stealing or modifying data without detection. However, software and network adversaries, such a malicious NIC, can change the address of the destination buffer during direct memory copy from the application's memory to the accelerator's memory, which can result in corruption of accelerator's memory. To prevent this, the incoming data coming from another device or NIC may be first copied into a temporary buffer (also referred to as a staging buffer) on the accelerator where it is decrypted and integrity is verified. The destination address is sent to the accelerator securely, either appended to the data package or separately sent, and the incoming address is verified against the expected address before it is copied from the temporary buffer to the destination buffer.

However, a technical problem resulting from this extra copy is that it incurs added latency to the data transfer, especially if the data block is large (such as with artificial intelligence (AI)/machine learning (ML) workloads). Also, the extra copy allocates temporary buffers, which can be substantially large and take away memory resources from the accelerator's compute kernel.

Embodiments herein provide for novel techniques for to address the above-noted technical drawbacks by providing for in-place memory copy during remote data transfer in a heterogeneous compute environment. Implementations provide for a hardware access control mechanism in the accelerator's memory management unit (that controls access to accelerator pages through page tables), to gate write transactions into the accelerator memory from a peer or NIC device without going through a staging or temporary buffer. Implementations herein define a state machine to transition the availability of accelerator pages for memory copy and compute kernel's use that prevent data corruption and ensure compute kernel does not consume invalid data.

Figure 8:
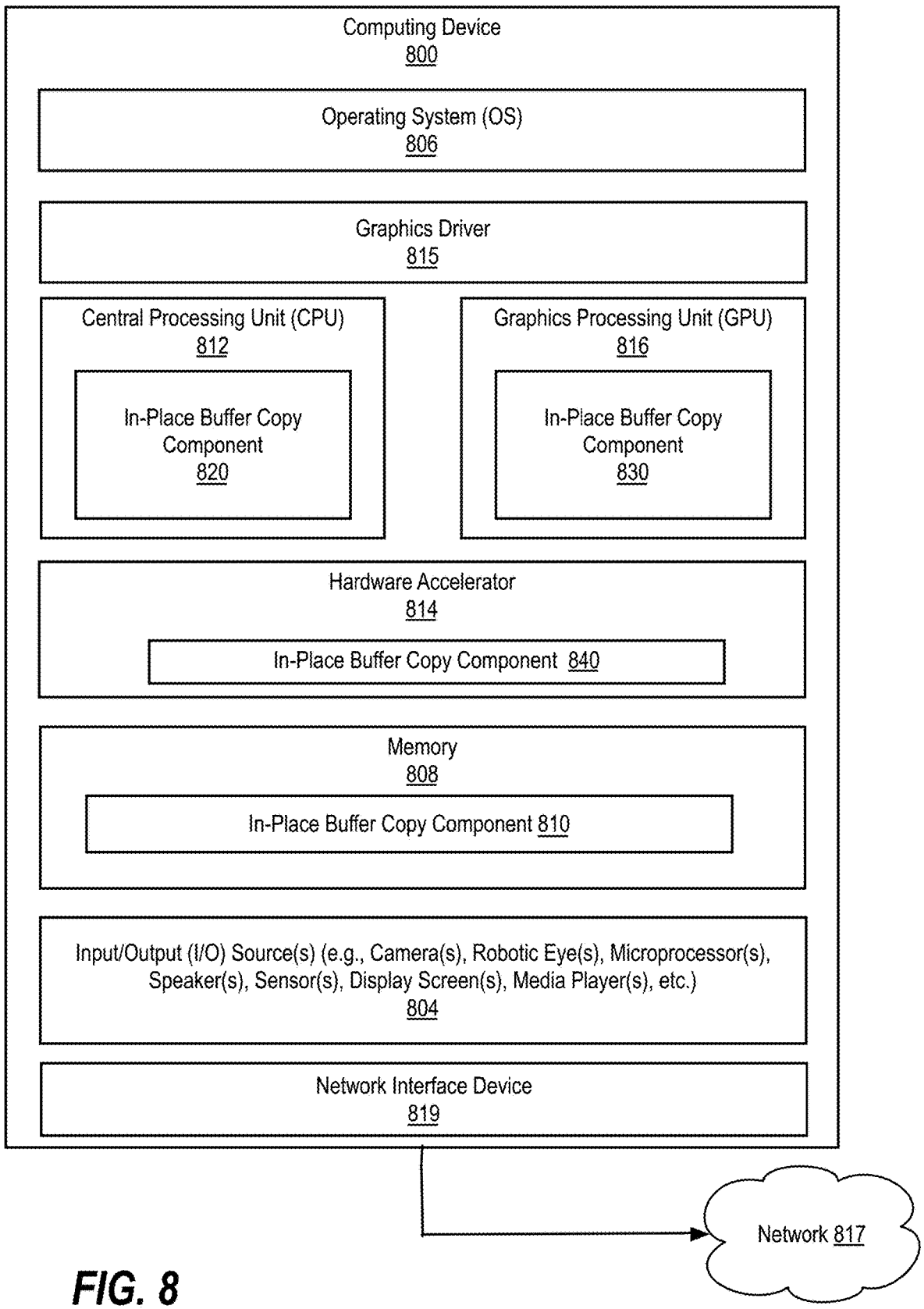
FIG. 8 illustrates a computing device employing an in-place buffer copy component for in-place memory copy during remote data transfer in a heterogeneous compute environment, according to implementations herein.

FIG. 8 illustrates a computing device 800 employing an in-place buffer copy component 810 for in-place memory copy during remote data transfer in a heterogeneous compute environment, according to implementations herein. Computing device 800 represents a communication and data processing device including or representing (without limitations) a server platform including application server platforms and/or remote acceleration server platforms, personal computing devices, smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, automotive infotainment devices, etc.

In some embodiments, computing device 800 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 800 may include a computer platform hosting an integrated circuit ("IC"), such as a system on a chip ("SoC" or "SOC"), integrating various hardware and/or software components of computing device 800 on a single chip.

As illustrated, in one embodiment, computing device 800 may include any number and type of hardware and/or software components, such as (without limitation) graphics processing unit ("GPU" or simply "graphics processor") 816 (such as the graphics processors described above with respect to any one of FIGS. 1-7), graphics driver (also referred to as "GPU driver", "graphics driver logic", "driver logic", user-mode driver (UMD), user-mode driver framework (UMDF), or simply "driver") 815, central processing unit ("CPU" or simply "application processor") 812 (such as the processors or CPUs described above with respect to FIGS. 1-7), hardware accelerator 814 (such as an FPGA, ASIC, a re-purposed CPU, or a re-purposed GPU, for example), memory 808, network devices, drivers, or the like, as well as input/output (I/O) sources 804, such as touchscreens, touch panels, touch pads, virtual or regular keyboards, virtual or regular mice, ports, connectors, etc. Computing device 800 may include operating system (OS) 806 serving as an interface between hardware and/or physical resources of the computing device 800 and a user.

It is to be appreciated that a lesser or more equipped system than the example described above may be utilized for certain implementations. Therefore, the configuration of computing device 800 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, in-place buffer copy component 810 may be hosted by memory 808 in communication with I/O source(s) 804, such as microphones, speakers, etc., of computing device 800. In another embodiment, in-place buffer copy component 810 may be part of or hosted by operating system 806. In yet another embodiment, in-place buffer copy component 810 may be hosted or facilitated by graphics driver 815. In yet another embodiment, in-place buffer copy component 810 may be hosted by or part of a hardware accelerator 814; for example, in-place buffer copy component 810 may be embedded in or implemented as part of the processing hardware of hardware accelerator 814, such as in the form of in-place buffer copy component 840. In yet another embodiment, in-place buffer copy component 810 may be hosted by or part of (e.g., executed by, implemented in, etc.) graphics processing unit ("GPU" or simply graphics processor") 816 or firmware of graphics processor 816; for example, in-place buffer copy component 810 may be embedded in or implemented as part of the processing hardware of graphics processor 816, such as in the form of in-place buffer copy component 830. Similarly, in yet another embodiment, in-place buffer copy component 810 may be hosted by or part of central processing unit ("CPU" or simply "application processor") 812; for example, in-place buffer copy component 810 may be embedded in or implemented as part of the processing hardware of application processor 812, such as in the form of in-place buffer copy component 820. In some embodiments in-place buffer copy component 810 may be provided by one or more processors including one or more of a graphics processor, an application processor, and another processor, wherein the one or more processors are co-located on a common semiconductor package.

It is contemplated that embodiments are not limited to certain implementation or hosting of in-place buffer copy component 810 and that one or more portions or components of in-place buffer copy component 810 may be employed or implemented as hardware, software, or any combination thereof, such as firmware. In one embodiment, for example, the in-place buffer copy component may be hosted by a machine learning processing unit which is different from the GPU. In another embodiment, the in-place buffer copy component may be distributed between a machine learning processing unit and a CPU. In another embodiment, the in-place buffer copy component may be distributed between a machine learning processing unit, a CPU and a GPU. In another embodiment, the in-place buffer copy component may be distributed between a machine learning processing unit, a CPU, a GPU, and a hardware accelerator.

Computing device 800 may host network interface device(s) 819 (such as a network interface card (NIC)) to provide access to a network 817, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as in-place buffer copy component 820, in-place buffer copy component 830, and/or in-place buffer copy component 840 hosted by application processor 812, graphics processor 816, and/or hardware accelerator 814, respectively, of FIG. 8 having to facilitate or execute the corresponding logic to perform certain tasks.

As discussed above, embodiments herein provide for confidential computing in a heterogeneous compute environment including a network-connected hardware accelerator. In some embodiments, an in-place buffer copy component 810-840 can be hosted by resources of a datacenter system. An example datacenter system could be hosted by a cloud service provider (CSP)) providing a variety of XPUs (heterogeneous processing units) for processing tasks at the datacenter, where an XPU can include one or more of: a central processing unit (CPU), a graphics processing unit (GPU) (including a general purpose GPU (GPGPU), ASICs, or other processing units (e.g., accelerators, inference accelerators, cryptographic accelerators, programmable or fixed function FPGAs, application-specific integrated circuit (ASICs), compression accelerators, and so on). The datacenter system may also provide storage units for data storage tasks, as well. The storage units may include solid state drive (SSD), for example.

In some embodiments, the example datacenter system may provide for disaggregated computing where the XPUs and/or storage units may be hosted with similar-type units (e.g., CPUS hosted on an application server (app server), SSDs hosted on a storage rack, GPUs hosted on a GPU rack, inference accelerators hosted on an inference accelerator server, cryptographic accelerators hosted on a cryptographic accelerator rack, and general-purpose accelerators hosted on accelerator rack. The datacenter system could then provide its hosted processing components with a variety of offloads using, for example, IPUs that are directly attached to the respective host processing component. Although IPUs are discussed for example purposes, other programmable network devices, such as DPUs or SmartNICs, may be used interchangeable for IPUs herein. The offloads provided may be networking, storage, security, etc. This allows the processing components to run without a hypervisor, and provides CSPs the capability of renting out the entire host in a datacenter to their security-minded customers, or avoid cross-talk and other problems associated with multi-tenant hosts.

An IPU can provide a role in data centers by providing the datacenter operator, such as a Cloud Service Provider (CSP), a control point for security, acceleration, telemetry and service orchestration. IPU architecture may build upon existing Smart Network Interface Card (SmartNIC) features and is a part of controlling security and data acceleration within and across distributed platforms. It is a secure domain controlled by CSPs for managing a platform, providing services to tenants, and securing access into the data center network. The IPU increases the performance and predictability for distributed runtimes and enables scaling to multi-terabit throughputs by offloading host services, reliable transport, and optimizing data copies.

As discussed above, embodiments herein provide for confidential computing in a heterogeneous compute environment including a network-connected hardware accelerator. In some embodiments, an in-place buffer copy component 810-840 can be hosted by resources of a datacenter system. For example, in-place buffer copy component 810-840 can be hosted by a CPU operating on an application server platform. Moreover, in-place buffer copy component 810-840 can also be hosted in any of one or more of IPUs, GPUs, FPGAs, ASICs, inference accelerators, cryptographic accelerators, and/or other special-purpose hardware accelerators of a datacenter system. In one implementation, in-place buffer copy component 810-840 enables transfers of data using any known data transfer protocol. For ease of discussion, implementations herein may be described as implementing an RDMA protocol for the data transfer.

RDMA refers to a direct memory access (DMA) from memory of one computing device into memory of another computing device without involving either computer devices' OSes. RDMA directly copies data between local and remote memory of the computing devices without calling the kernel drivers. Received buffers do not have to be copied twice and the kernel does not use CPU clock cycles for RDMA buffer copy. As such, RDMA enables faster data transfer through networks and reduces the overhead to the CPU because an application and an RDMA Network Interface Controller (RDMA NIC or RNIC) interface directly. In traditional networking, such as sockets, TCP/IP, and Ethernet, the kernel intermediates the interface between the application and the RNIC, resulting in an additional copy of data buffers.

RDMA offers technical advantages including, but not limited to, reducing context switching between user space and kernel space in the OS, eliminating the extra buffer copy, and reducing CPU cycles consumed by the kernel (in host). RDMA also reduces interrupts because it coalesces processing of packets to an interrupt for completion of a RDMA transfer. The RNIC also offloads network transport processing (e.g., TCP/IP) from the host.

With respect to confidential computing, security sensitive applications that request strong assurance that their workload (data and/or compute logic) has confidentiality and integrity in the presence of software and hardware adversaries use confidential computing. The confidential computing can use hardware-supported trusted execution environments (TEE) on the CPU. Protection of confidential computation and data of the application with the TEE can be restricted to the CPU because protection of the TEE is available within the CPU. If the computation involves use of HW accelerators, such as FPGA and GPU, these accelerators should also support TEEs to provide HW enforced isolation of the customer's workload on the accelerator. In such a solution, the communication between the CPU TEE and Device TEE should be protected such that workload has confidentiality and integrity during transit from software and hardware adversaries on the platforms, as well on the network.

RDMA is an efficient way to transfer data between network-connected compute devices. RDMA enables direct memory copy from one device to a remote device connected through a network. While there are application-level security protocols, such as transport layer security (TLS) and secure sockets layer (SSL), that can used to protect RDMA transfers, they are not suitable for use with RDMA as RDMA read and write operations can operate as purely one-sided communications. Furthermore, these approaches utilize additional data copying.

Implementations herein can utilize any of a variety of data transfer protocols. However, RDMA is discussed herein as an example data transfer protocol. RDMA enables an application and an RDMA-capable NIC (referred to herein as RNIC) to directly access memory of a remote platform, avoiding buffer copy from application memory to kernel memory and avoiding the overhead of switching between the application and the kernel OS or VMM. The application and NIC interface with each other via queues. The application posts requests for memory access and, the RDMA enabled NIC (RNIC), processes the requests to transfer data directly from application's memory to remote memory via remote NIC. Once the transfer is complete, RNIC signals completion of the work requests to the application. The RNIC interface, (i.e., queues) are available to the application on the same platform as the NIC. An application cannot post RDMA work requests to an RNIC on a different platform.

Another characteristic of RDMA is that the NIC processing the RDMA work (i.e., the initiator of RDMA) requests access to memory to the remote NIC through the RDMA protocol. The remote RNIC can access the remote memory in response without utilizing processing by the CPU (or other controller or processor) of the remote platform.

The data, and sometimes commands, of an application running on a distributed system, are transferred between processing elements to cooperate in the computation. Computation resources (time and logic) used to transfer workloads are counted as overhead of distributed computation relative to processing the workload on processing elements on the same platform (directly connected components). RDMA's efficient data transfer reduces the overhead and latency, enabling better performance of distributed computational systems. In turn, this allows a wider range and more applications to run in distributed systems with higher performance.

Protection of computation in distributed platforms is more complex than in a single platform. Distributed computation exposes data and possibly algorithms (IP in the form of commands) when workloads are shared between processing elements. For confidential computing solutions, data may be encrypted and integrity-protected during memory copy to prevent software and/or network adversaries from stealing or modifying data without detection. However, software and network adversaries, such a malicious NIC, can change the address of the destination buffer during direct memory copy from the application's memory to the accelerator's memory, which can result in corruption of accelerator's memory. To prevent this, the incoming data coming from another device or NIC may be first copied into a temporary buffer (also referred to as a staging buffer) on the accelerator where it is decrypted and integrity is verified. The destination address is sent to the accelerator securely, either appended to the data package or separately sent, and the incoming address is verified against the expected address before it is copied from the temporary buffer to the destination buffer.

However, a technical problem resulting from this extra copy is that it incurs added latency to the data transfer, especially if the data block is large (such as with artificial intelligence (AI)/machine learning (ML) workloads). Also, the extra copy allocates temporary buffers, which can be substantially large and take away memory resources from the accelerator's compute kernel.

Embodiments herein provide for novel techniques to address the above-noted technical drawbacks by providing for in-place memory copy during remote data transfer in a heterogeneous compute environment. Implementations provide for a hardware access control mechanism in the accelerator's memory management unit (that controls access to accelerator pages through page tables), to gate write transactions into the accelerator memory from a peer or NIC device without going through a staging or temporary buffer. Implementations herein define a state machine to transition the availability of accelerator pages for memory copy and compute kernel's use that prevent data corruption and ensure compute kernel does not consume invalid data.

Implementations herein provide the technical advantages of reducing latency of applications that use network-connected accelerators. Furthermore, implementations herein provide the technical advantage of improving memory resource utilization in the network-connected accelerators.

Figure 9:
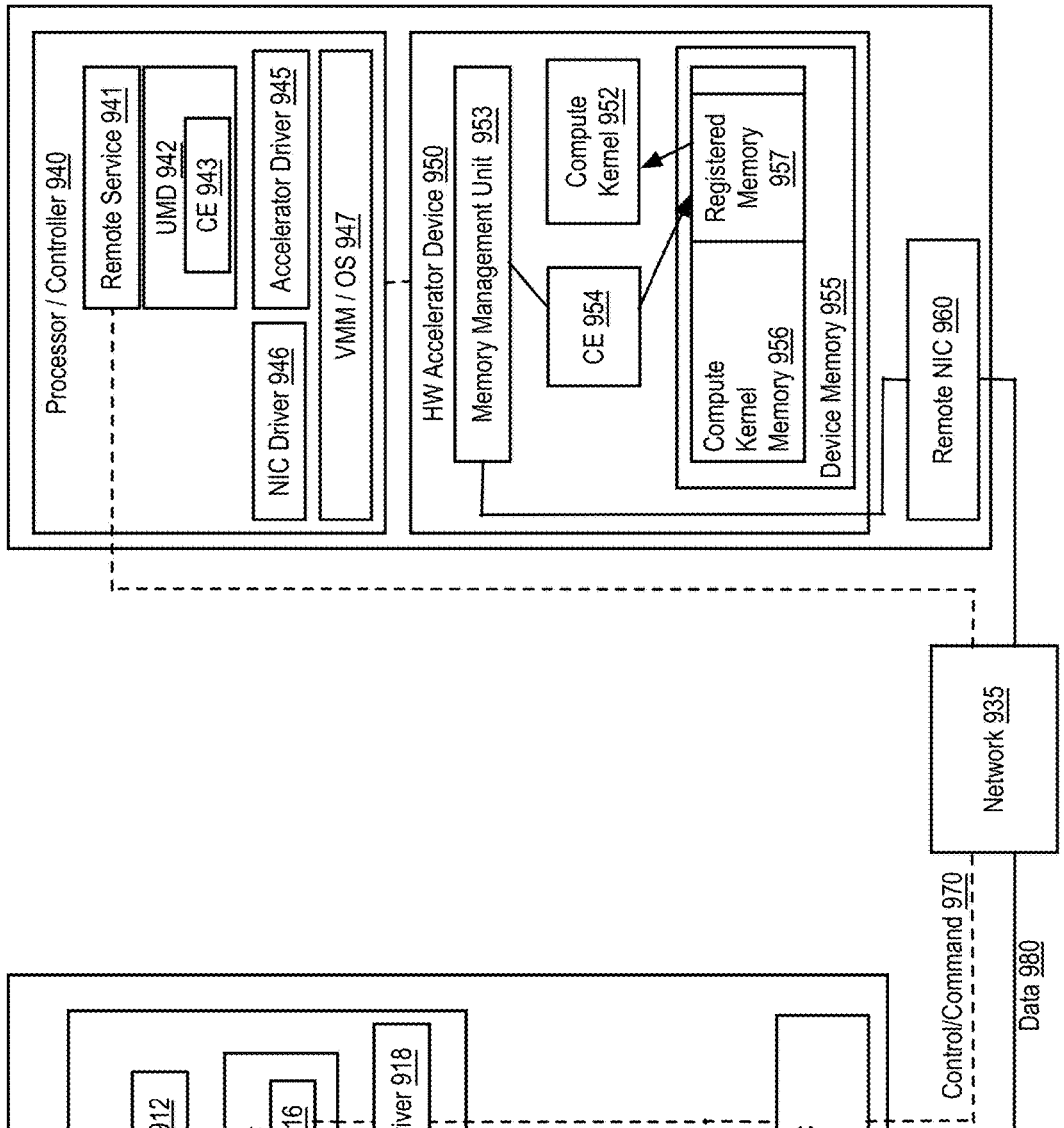
FIG. 9 is a block diagram depicting a computing environment for in-place memory copy during remote data transfer in a heterogeneous compute environment, in accordance with implementations herein.

FIG. 9 is a block diagram depicting a computing environment 900 for in-place memory copy during remote data transfer in a heterogeneous compute environment, in accordance with implementations herein. Computing environment 900 includes an application server platform 902 communicably coupled to an acceleration server platform 904.

The computing environment 900 may be a datacenter hosting an application server platform 902 and at least one acceleration server platform 904. In one implementation, application server platform 902 and/or acceleration server platform 904 may be the same as computing device 800 described with respect to FIG. 8.

As illustrated, application server platform 902 may include a processor, such as a CPU 910, a memory 920, and a local NIC 930. In one embodiment, CPU 910 can host an application 912 and a user mode driver (UMD) 914. The UMD 914 may further host a cryptographic engine (CE) 916. In one implementation, CPU 910 may provide a TEE (not shown), which may be Intel® SGX, Intel® TDX, AMD® SEV or ARM® Realm, to name a few examples, in which an application 912 and the UMD 914 are running. As such, application 912 may be referred to as a secure application 912. In some embodiments, local NIC 930 may be referred to as an untrusted NIC 930 if it is not part of the TCB of the application 912 provided by the TEE.

The application 912 and UMD 914, may interface with an OS and/or VMM (not shown). OS/VMM may interface with memory 920 of the application server platform 902. Memory 920 may include application memory 922 assigned to application 912. A portion of application memory 922 may be registered memory 924. Registered memory 924 may refer to application memory 922 that is registered with the local NIC 930 so that local NIC 930 can move data from the application memory 922 over network 935 to a network-connected entity, such as hardware accelerator device 950. Registered memory is also visible to the remote device (e.g., remote accelerator or remote CPU), which enables the remote device to initiate a memory copy operation. Application server platform 902 may use NIC 930 to communicate over network 935 with acceleration server platform 904 using a data transfer protocol, such as RDMA.

In implementations herein, the computing environment may be a heterogeneous or disaggregated computing environment where the application server platform 902 provides a processor, such as CPU 910, but does not include a physically-attached hardware accelerator. An accelerator runtime library, such as the UMD 914, is linked to the application 912 and is remoting aware and optimized for performance and security. Remoting aware refers to the capability of the UMD 914 to detect that there is no local accelerator and to request allocation of a network-connected accelerator.

Application server platform 902 may be communicably coupled, for example via a network (e.g., local area network or wide area network, etc.), to one or more acceleration server platforms, such as acceleration server platform 904. Acceleration server platform 904 may be provided in computing environment 900 to facilitate distributed heterogeneous computing in the computing environment 900. Acceleration server platform 904 may host one or more hardware (HW) accelerator devices 950 used to accelerate workloads of the application 912 running on CPU 910 of application server platform 902. HW accelerator device 950 may include, but is not limited to, a GPU, FPGA, ASIC, compression accelerator, cryptographic accelerator, special-purpose CPUs, and so on.

Acceleration server platform 904 includes a processor (e.g., a CPU) and/or a controller 940, a hardware (HW) accelerator device 950, and a remote NIC 960. In some implementations, the processor/controller 940, the HW accelerator device 950, and/or the remote NIC 960 are integrated together on the same chip, are implemented as separate devices, or some combination of the above.

The processor/controller 940 may host a remote service 941, a UMD 942, an accelerator driver 945 for the HW accelerator device 950, a NIC driver 946 for the remote NIC 960, and a VMM/OS 947. In some implementations, the remote service 941, UMD 942, and accelerator driver 945 can be part of a TCB of a TEE (not shown). In one embodiment, the remote service 941 includes application control logic for the application 912 hosted on application server platform 902. The remote service 941 may provide the UMD 942 for the application 912, where the UMD 942 runs on the accelerator server platform 904 to assist the application 912 in workload offload to the HW accelerator device 950. Similar to UMD 914, UMD 942 hosts a cryptographic engine (CE) 943.

As noted above, HW accelerator device 950 can be any type of accelerator device including, but not limited to, a GPU, FPGA, ASIC, special-purpose CPU, inference accelerator, cryptographic accelerator, and so on. The HW accelerator device 950 can include a memory management unit (MMU) 953, a cryptographic engine (CE) 954, a compute kernel 952, and device memory 955. In implementations herein, the CE 954 and compute kernel 952 can be part of a TCB of a TEE (not shown) hosted on the HW accelerator device 950. The compute kernel 952 may include the accelerated part of application 912 workload's memory on the acceleration server platform 904.

Device memory 955 may include compute kernel memory 956 dedicated to the compute kernel 952 that corresponds to application 912 workload running on the HW accelerator device 950. A portion of the compute kernel memory 956 may include registered memory 957. Similar to registered memory 924, registered memory 957 may refer to compute kernel memory 956 that is registered with the remote NIC 960 so that remote NIC 960 can move data to and from the compute kernel memory 956 over network 935 to a network-connected entity, such as application server platform 902.

In the example computing environment 900, the HW accelerator device 950 is shown as not including a built-in network capability. Instead, there is the remote NIC 960 that performs network functions for the processor/controller 940 and the HW accelerator device 950. Although the example computing environment 900 is depicted and discussed herein with this particular network topology, implementations herein can operate on a variety of configurations, including the ones where the HW accelerator device 950 includes an integrated NIC. The following description assumes an example configuration where the remote NIC 960 is external and not integrated in the HW accelerator device 950, but implementations are not limited to such a configuration.

In implementations herein, the UMD 914 is optimized for performance and can split a control/command path 970 (referred to herein as command communication channel, command path, command, control communication channel, control path, or control; illustrated with dashed line) and a data path 980 (referred to herein as data communication channel or data; illustrated with solid line) if the acceleration server platform 904 supports protocols such as RDMA that allow copying data directly to the HW accelerator device memory 955, bypassing the processor/controller 940 on the acceleration server platform 904. The UMD 914 can send control messages to the remote service 941, which parses them and submits commands to the accelerator driver 945, which in turn sends it to the HW accelerator device 950.

In implementations herein, the CE 916 may apply a cryptographic algorithm, such as AES GCM, to encrypt and integrity protect the application's 912 data. In one implementation, a message authenticate code (MAC) is generated over the entire block of data being transferred to minimize overhead from integrity verification. In some implementations, the CE 916 can also embed counters that allow for verifying that the order in which the data is sent cannot be manipulated by software or network adversary without detection. In the example computing environment 900, both NICs 930, 960 may be considered untrusted and are outside the trust boundary. As such, to detect if either of the NICs 930, 960 have maliciously modified the destination address, which can corrupt the HW accelerator device's memory 955, the UMD 914 includes a hash of the destination buffer address, and either cryptographically binds the hash to the data being transferred or securely send the hash separately to the HW accelerator device 950.

On the accelerator server platform 904 side, the corresponding CE 954 of the HW accelerator device 950 can decrypt the data and verify the integrity of the transfer including the order of data transfer. The CE 954 also verifies that the destination address is not modified by computing the hash of the address and comparing that with the hash that is included with the data.

In implementations herein, the computing environment 900 provides for in-place memory copy during remote data transfer in a heterogeneous compute environment of the application server platform 902 and networked devices, such as the HW accelerator device 950 of the acceleration server platform 904. The following discussion of computing environment 900 utilizes the example of a remote data transfer from application memory 922 of application 912 on CPU 910 to a remote compute kernel memory 956 on HW accelerator device 950. However, implementations herein can also apply to direct memory copy from one HW accelerator device's memory to another HW accelerator device's memory. Also, in this discussion, the NIC(s) 930, 960 are described to be the adversary. However, the threat may come from other sources, such as malicious system software on the application server platform 902 or acceleration server platform 904, or network adversaries such as switches and gateways. For this discussion, RDMA protocol may be referred to as an example of direct memory copy protocol, but this applies to other protocols that allow direct memory copy between peer devices as well.

In one implementation, a secure memory copy can occur from the application 912 running on CPU 910 to HW accelerator device 950, where the two devices expose parts of their application's memory to each other through a memory registration process. In case of RDMA protocol, the memory is registered with the NIC 930, 960 (as registered memory 924, 957) so that the NIC 930, 960 can move data from application's memory to acceleration kernel's memory and vice versa. In some implementations, NIC drivers 918, 946 enable interfacing by application 912 and remote service 941 with NICs 930, 960, respectively.

In implementations herein, the MMU 953 on the HW accelerator device 950 manages the access to the pages in the HW accelerator device's device memory 955. The MMU 953 may also be referred to as a memory control unit, an I/O MMU, and so on. The MMU 953 manages the access to memory pages in the HW accelerator device's 950 device memory 955. The MMU 953 may maintain one or more page tables to manage such access and may hardware access circuitry to manage the access to memory pages based on one or more state machines, for example.

In one embodiment, to implement the in-place memory copy during remote data transfer described herein, three bits are added to page tables of the MMU 953 used to manage the access control provided by implementations herein. The three bits enable the following states for the pages: (1) registered pages; (2) free pages; (3) restricted pages; and (4) live pages.

Registered pages refer to pages registered with the remote NIC 960. Write transactions coming from remote NIC 960 can allowed to go to these registered pages, while write transactions address to non-registered pages are dropped. The corollary to Registered pages are Unregistered pages, which are memory pages in device memory 955 that have not been registered to the remote NIC 960.

Free pages refer to Registered pages that are available for the remote NIC 960 to write to, but not available for the compute kernel for consumption. All initially registered pages are free pages and available for remote NIC 960 to write to. Registered pages also become free after the compute kernel 952 has consumed the data and marks it back as available for next memory copy.

Restricted pages refer to the Registered pages where the remote NIC 960 completed a data copy and is pending integrity verification check before being available for the compute kernel 952 to use. These Restricted pages are not available for the remote NIC 960 to write to or for the compute kernel 952 to consume.

Live pages refer to Registered pages where the data has decrypted and the integrity has been verified. Live pages are considered ready for the compute kernel 952 to consume. The remote NIC 960 is not allowed access to Live pages.

Table 1 below shows the bits added to the MMU 953 in implement in-place memory copy during remote data transfer, along with possible states and access implications.

TABLE 1

MMU Bits for In-Place Memory Copy

| MMU Bits for In-Place Memory Copy | | | Access Implication | | Description |
|---|---|---|---|---|---|
| Registered | Free | Live | NIC write allowed | Available to Compute Kernel | |
| 0 | x | x | N | Y* | Unregistered GPU page - write transactions from NIC are not allowed Compute Kernel can use this page if it is allocated to it |
| 1 | 1 | x | Y | N | Registered & Free: available for NIC transfer |
| 1 | 0 | 0 | N | N | Registered & Restricted: Data has been decrypted. Integrity verification in progress. Not available for NIC or Compute Kernel |
| 1 | 0 | 1 | N | Y | Registered & Live page: Data is available for GPU compute kernel to use, NIC cannot write to it |

The CE 954 of the HW accelerator device 950 can decrypt any incoming data received at remote NIC 960 and compute a running MAC as data is written into device memory 955. When the transfer is complete, the CE 954 finalizes the MAC and verifies it.

Figure 10:
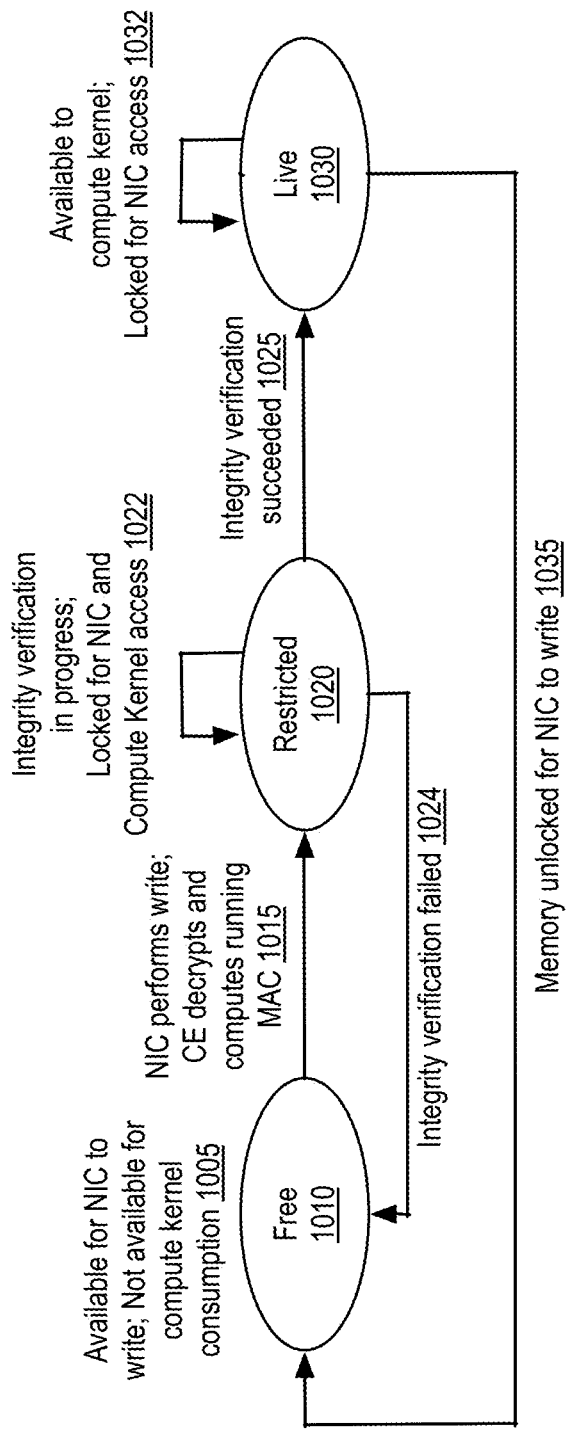
FIG. 10 is a block diagram depicting a state diagram for registered pages, in accordance with implementations herein.

FIG. 10 is a block diagram depicting a state diagram 1000 for registered pages, in accordance with implementations herein. The state diagram 1000 may be implemented by a state machine provided by hardware access circuitry in MMU 953 of HW accelerator device 950.

The state diagram depicts three states of registered pages maintained by an MMU 953. In some implementations, the states may be indicated in the MMU 953 utilizing the bits described above with respect to Table 1. The three states include free 1010, restricted 1020, and live 1030. Each of the three states 1010-1030 is associated with the registered bit being set in the MMU 953. It can be noted that is the registered bit is not set for a memory page, then that page is considered an unregistered page.

When a memory page is initially registered with the NIC, it is set in a free state 1010. The free state 1010 indicates that the memory page is available for the NIC to write to, but not available for compute kernel consumption 1005. The NIC may then perform a write to a memory page indicated as a free page. In this case, the CE 954 of the HW accelerator device can decrypt the page data and compute a running MAC on the memory page 1015. At this point, the state of the memory page is changed to the restricted state 1020.

The restricted state 1020 indicates that integrity verification is in progress 1022. In the restricted state 1020, the memory page is locked for both NIC and compute kernel access. When the transfer is complete, the CE can finalize the MAC and verify its integrity. If the integrity verification succeeds 1025, the memory page is changed to the live state 1030. On the other hand, if the integrity verification fails, 1024, then the memory page is changed back to the free state 1010.

The live state 1030 indicates that the memory page is available for consumption by the compute kernel 1032. The NIC is not allowed to write to any memory pages have a live state 1030. Once the compute kernel has consumed the data and marks it back as available for next memory copy 1035, the memory page is changed back to the free state 1010 and is unlocked for the NIC to write to.

Figure 11:
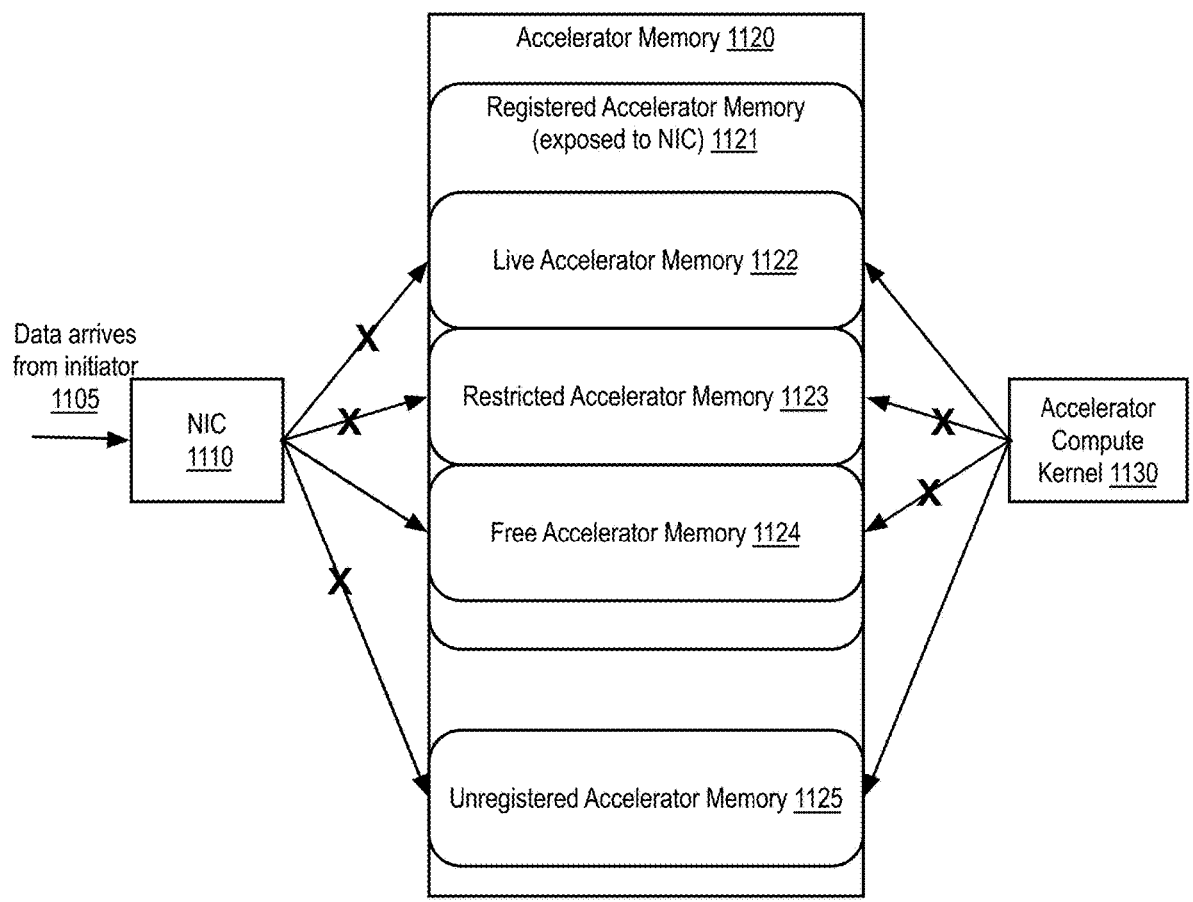
FIG. 11 depicts a block diagram of the acceleration server platform providing different access scenarios for in-place memory copy, in accordance with implementations herein.

FIG. 11 depicts a block diagram of the acceleration server platform 1100 providing different access scenarios for in-place memory copy, in accordance with implementations herein. Acceleration server platform 1100 includes a NIC 1110, accelerator memory 1120, and accelerator compute kernel 1130. In one implementation, acceleration server platform 1100 is the same as acceleration server platform 904 described with respect to FIG. 9. Similarly, NIC 1110 may be the same as remote NIC 960, accelerator memory 1120 may be the same as device memory 955, and/or accelerator compute kernel 1130 may be the same as compute kernel 952, each as described with respect to FIG. 9.

As shown in FIG. 11, accelerator memory 1120 may include registered accelerator memory 1121 and unregistered accelerator memory 1125. Registered accelerator memory 1121 may include those portions of compute kernel memory that are exposed (i.e., registered) to the NIC 1110. Unregistered accelerator memory 1125 include memory pages of the compute kernel memory that are not registered to the NIC 1110. The registered accelerator memory 1121 may further include live accelerator memory 1122, restricted accelerator memory 1123, and free accelerator memory 1124. Live 1122, restricted 1123, and free 1124 memory pages may be the same as detailed above with respect to Table 1 and FIG. 10, for example.

When data arrives from an initiator 1105 (such as from an application at a remote application server platform) at NIC 1110, an MMU (not shown; such as MMU 953 of FIG. 9) of the acceleration server platform 1100 performs access control to allow a write transaction to only go to Registered accelerator memory 1121. Furthermore, as shown in FIG.

11, the access control can further limit access by the NIC 1110 to only memory pages indicated as free accelerator memory 1124 and limit access by the accelerator compute kernel 1130 to memory pages indicated as live accelerator memory 1122 and unregistered accelerator memory 1125.

Referring back to FIG. 9 and with reference to FIGS. 10-11, the following description provides an example process for in-place memory copy during remote data transfer in a heterogeneous compute environment.

Initially, an accelerator buffer of compute kernel memory 956 is registered with remote NIC 960, facilitated by accelerator driver 945 and NIC driver 946. This memory is considered registered memory 957 and is exposed to the remote application 912 for reading/writing. Remote NIC 960 is allowed to perform a direct copy of data from remote application's 912 registered memory 924 to HW accelerator device's 950 registered memory 957. The accelerator driver 945 can program the HW accelerator device's 950 MMU 953 to indicate which pages have been registered with remote NIC 960. In some implementations, for performance consideration, memory registration may be done once as the overhead can be high.

The HW accelerator device 950 MMU 953 can perform access control to allow write transactions coming from a PCIe peer (e.g., remote NIC 960 in this case) to only go to registered memory 957, and only to the pages that are indicated as "free" (i.e., memory exposed to remote application and can be read/written by NIC).

In implementations herein, the MMU 953 utilizes tags (e.g., bits) to indicate which memory is registered for access by NIC 960 (e.g., allow read/writes from NIC to only those pages). Initially, all registered pages are Free and available for NIC to read/write. As the remote NIC 960 writes to a Free page, the MMU 953 changes the page status to Restricted. The inline CE 954 decrypts the data and keeps a running MAC. The MAC is computed over the entire buffer transfer to reduce the overhead of integrity verification. As such, until transfer is complete, the CE 954 cannot verify the MAC. Hence, the pages are marked restricted and the remote NIC 960 can note write to it and the compute kernel 952 cannot consume it.

At the end of transfer, the CE 954 completes the MAC computation and verifies the integrity. The integrity verification result is returned to the MMU 953, which changes the state to live if the integrity verification is successful, thus making it available to the compute kernel 952. If the integrity verification fails, then the MMU 953 marks the page free. After the compute kernel 952 consumes the pages, the pages may go back to being available, or free, for the remote NIC 960 to write the next buffer.

FIG. 12 is a flow diagram illustrating a method 1200 for in-place memory copy during remote data transfer in a heterogeneous compute environment, in accordance with implementations herein. Method 1200 may be performed by processing logic that may comprise hardware (e.g., circuitry, dedicated logic, programmable logic, etc.), software (such as instructions run on a processing device), or a combination thereof. More particularly, the method 1200 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 1200 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 8-11 may not be repeated or discussed hereafter. In one implementation, a processor of acceleration server platform, such as acceleration server platform 904 described with respect to FIG. 9 may perform method 1200.

Method 1200 begins at block 1210 where the processor may receive data at NIC of hardware accelerator device as part of data transfer from application of remote application server platform. Then, at block 1220, the processor may identify a destination address of memory to write the data. At block 1230, the processor may determine that access control bits of destination address in MMU page tables indicate memory pages of destination address are registered and free memory pages.

Subsequently, at block 1240, the processor may write the data to the memory pages of the destination address. Then, at block 1250, the processor may update access control bits for memory pages of destination address to indicate memory pages are restricted. Lastly, at block 1260, the processor may, responsive to successful integrity verification of the data transfer, update access control bits for memory pages of destination address to indicate memory pages are live. In one implementation, a compute kernel of the hardware accelerator device can consume the data from the memory pages when the access control bits indicate the memory pages are live.

Figure 13:
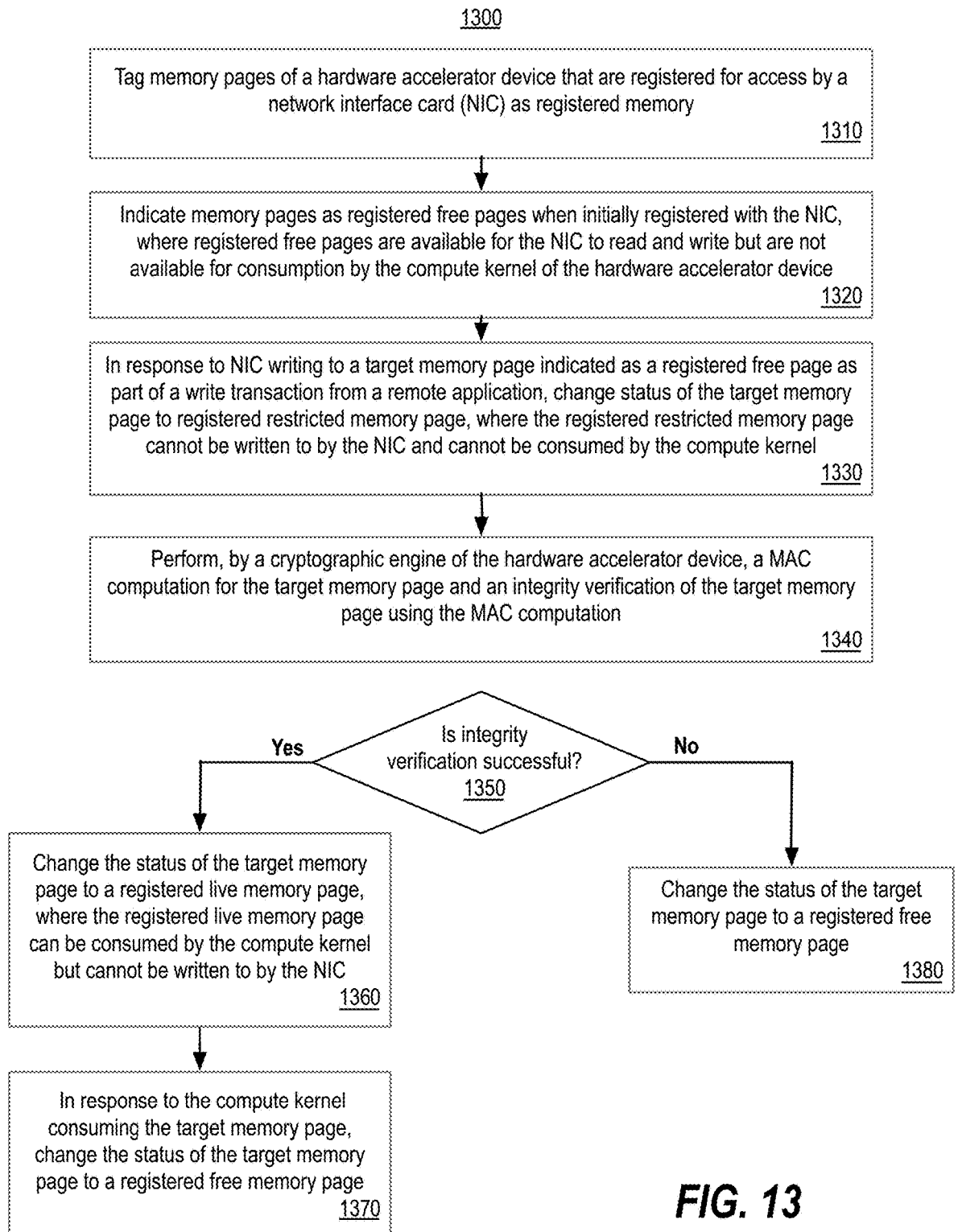
FIG. 13 is a flow diagram illustrating a method for in-place memory copy during remote data transfer in a heterogeneous compute environment, in accordance with implementations herein.

FIG. 13 is a flow diagram illustrating a method 1300 for in-place memory copy during remote data transfer in a heterogeneous compute environment, in accordance with implementations herein. Method 1300 may be performed by processing logic that may comprise hardware (e.g., circuitry, dedicated logic, programmable logic, etc.), software (such as instructions run on a processing device), or a combination thereof. More particularly, the method 1300 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 1300 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 8-12 may not be repeated or discussed hereafter. In In one implementation, a processor of acceleration server platform, such as acceleration server platform 904 described with respect to FIG. 9 may perform method 1300.

Method 1300 begins at block 1310 where a processor may tag memory pages of a hardware accelerator device that are registered for access by a NIC as registered memory. Then, at block 1320, the processor may indicate memory pages as registered free pages when initially registered with the NIC. In one implementation, the registered free pages are available for the NIC to read and write but are not available for consumption by the compute kernel of the hardware accelerator device.

At block 1330, the processor may, in response to the NIC writing to a target memory page indicated as a registered free page as part of a write transaction from a remote application, change status of the target memory page to registered restricted memory page. In one implementation, the registered restricted memory page cannot be written to by the NIC and cannot be consumed by the compute kernel.

Subsequently, at block 1340, the processor may perform, by a cryptographic engine of the hardware accelerator device, a MAC computation for the target memory page and an integrity verification of the target memory page using the MAC computation. At decision block 1350, the processor determines whether the integrity verification is successful.

If so, method 1300 proceeds to block 1360 where the processor may change the status of the target memory page to a registered live memory page. In one implementation, the registered live memory page can be consumed by the compute kernel but cannot be written to by the NIC. Then, at block 1370, the processor may, in response to the compute kernel consuming the target memory page, change the status of the target memory page to a registered free memory page.

If at decision block 1350, the processor determines that the integrity verification has failed, then method 1300 proceeds to block 1380. At block 1380, the processor may change the status of the target memory page to a registered free memory page.

Flowcharts representative of example hardware logic, machine readable instructions, hardware implemented state machines, and/or any combination thereof for implementing the systems, already discussed. The machine readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the whole program and/or parts thereof could alternatively be executed by a device other than the processor and/or embodied in firmware or dedicated hardware. Further, although the example program is described with reference to the flowcharts illustrated in the various figures herein, many other methods of implementing the example computing system may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus to facilitate in-place memory copy during remote data transfer in a heterogeneous compute environment. The apparatus of Example 1 comprises a processor to: receive data via a network interface card (NIC) of a hardware accelerator device as part of data transfer from an application of remote application server platform; identify a destination address of memory of the hardware accelerator device to write the data; determine that access control bits of the destination address in page tables maintained by a memory management unit (MMU) indicate that memory pages of the destination address are both registered and free; in response to the access control bits indicating that the memory pages of the destination address are both registered and free, write the data to the memory pages of the destination address; and subsequent to writing the data to the memory pages, update the access control bits for memory pages of the destination address to indicate that the memory pages are restricted, wherein setting the access control bits to restricted prevents the NIC and a compute kernel of the hardware accelerator device from accessing the memory pages.

In Example 2, the subject matter of Example 1 can optionally include wherein the processor is further to: responsive to successful integrity verification of the data transfer, update the access control bits for the memory pages of the destination address to indicate that the memory pages are live, wherein the compute kernel is allowed to consume the data from the memory pages when the access control bits indicate the memory pages are live. In Example 3, the subject matter of any one of Examples 1-2 can optionally include wherein the hardware accelerator device comprises a cryptographic engine to decrypt contents of the data that is encrypted and integrity-protected by the application, and wherein the cryptographic engine to perform integrity verification of the decrypted data by computing a first hash of the destination address and comparing that to a second hash that is provided with the data, while using a message authentication code (MAC) computed over the data.

In Example 4, the subject matter of any one of Examples 1-3 can optionally include wherein the NIC is a remote direct memory access (RDMA) NIC (RNIC) to perform data transfers with the application server platform using an RDMA protocol. In Example 5, the subject matter of any one of Examples 1-4 can optionally include wherein the data is received via a data communication channel that is an integrity-protected data channel between the hardware accelerator device and an application server platform, the data communication channel established via an attestation and key exchange protocol; and wherein a control communication channel that is separate from the data communication channel is secured between the hardware accelerator device and the application server platform.

In Example 6, the subject matter of any one of Examples 1-5 can optionally include wherein the processor is further to: responsive to failure of integrity verification of the data transfer, update the access control bits for the memory pages of the destination address to indicate that the memory pages are free, wherein the NIC is allowed to write to the memory pages of the destination address when the access control bits indicate that the memory pages are free. In Example 7, the subject matter of any one of Examples 1-6 can optionally include wherein other memory pages of the memory that are not registered to the NIC have access control bits set in the page tables to indicate being unregistered, and wherein the NIC is preventing from accessing the other memory pages with the access control bits set as unregistered.

In Example 8, the subject matter of any one of Examples 1-7 can optionally include wherein the access control bits comprise three bits in the page tables. In Example 9, the subject matter of any one of Examples 1-8 can optionally include wherein a first bit of the access control bits indicates a registered/unregistered status, a second bit of the access control bits indicates a free status, and a third bit of the access control bits indicates a live status, and wherein when the second bit and third bit are not set this indicates a restricted status. In Example 10, the subject matter of any one of Examples 1-9 can optionally include wherein the processor comprises one or more of a graphics processing unit (GPU), a central processing unit (CPU), or a hardware accelerator, and wherein the accelerator platform comprises a hardware accelerator device receiving offload of workloads from the processor.

Example 11 is a method for facilitating in-place memory copy during remote data transfer in a heterogeneous compute environment. The method of Example 11 can include receiving, by a network interface card (NIC) of a hardware accelerator device, data as part of data transfer from application of remote application server platform; identifying, by the hardware accelerator device, a destination address of memory of the hardware accelerator device to write the data; determining that access control bits of destination address in page tables maintained by a memory management unit (MMU) indicate that memory pages of the destination address are both registered and free; in response to the access control bits indicating that the memory pages of the destination address are both registered and free, writing the data to the memory pages of the destination address; and subsequent to writing the data to the memory pages, updating the access control bits for memory pages of the destination address to indicate that the memory pages are restricted, wherein setting the access control bits to restricted prevents the NIC and a compute kernel of the hardware accelerator device from accessing the memory pages.

In Example 12, the subject matter of Example 11 can optionally include further comprising: responsive to successful integrity verification of the data transfer, updating the access control bits for the memory pages of the destination address to indicate that the memory pages are live, wherein the compute kernel is allowed to consume the data from the memory pages when the access control bits indicate the memory pages are live. In Example 13, the subject matter of Examples 11-12 can optionally include wherein the hardware accelerator device comprises a cryptographic engine to decrypt contents of the data that is encrypted and integrity-protected by the application, and wherein the cryptographic engine to perform integrity verification of the decrypted data by computing a first hash of the destination address and comparing that to a second hash that is provided with the data, while using a message authentication code (MAC) computed over the data.

In Example 14, the subject matter of Examples 11-13 can optionally include further comprising: responsive to failure of integrity verification of the data transfer, updating the access control bits for the memory pages of the destination address to indicate that the memory pages are free, wherein the NIC is allowed to write to the memory pages of the destination address when the access control bits indicate that the memory pages are free. In Example 15, the subject matter of Examples 11-14 can optionally include wherein other memory pages of the memory that are not registered to the NIC have access control bits set in the page tables to indicate being unregistered, and wherein the NIC is preventing from accessing the other memory pages with the access control bits set as unregistered.

Example 16 is a non-transitory computer-readable storage medium for facilitating in-place memory copy during remote data transfer in a heterogeneous compute environment. The non-transitory computer-readable storage medium of Example 16 having stored thereon executable computer program instructions that, when executed by one or more processors, cause the one or more processors to perform operations comprising: receiving, by a network interface card (NIC) of a hardware accelerator platform comprising the one or more processors, data as part of data transfer from application of remote application server platform toa. hardware accelerator device of the hardware accelerator platform; identifying, by the hardware accelerator device, a destination address of memory of the hardware accelerator device to write the data; determining that access control bits of destination address in page tables maintained by a memory management unit (MMU) indicate that memory pages of the destination address are both registered and free; in response to the access control bits indicating that the memory pages of the destination address are both registered and free, writing the data to the memory pages of the destination address; and subsequent to writing the data to the memory pages, updating the access control bits for memory pages of the destination address to indicate that the memory pages are restricted, wherein setting the access control bits to restricted prevents the NIC and a compute kernel of the hardware accelerator device from accessing the memory pages.

In Example 17, the subject matter of Example 16 can optionally include wherein the operations further comprising: responsive to successful integrity verification of the data transfer, updating the access control bits for the memory pages of the destination address to indicate that the memory pages are live, wherein the compute kernel is allowed to consume the data from the memory pages when the access control bits indicate the memory pages are live. In Example 18, the subject matter of Examples 16-17 can optionally include wherein the hardware accelerator device comprises a cryptographic engine to decrypt contents of the data that is encrypted and integrity-protected by the application, and wherein the cryptographic engine to perform integrity verification of the decrypted data by computing a first hash of the destination address and comparing that to a second hash that is provided with the data, while using a message authentication code (MAC) computed over the data.

In Example 19, the subject matter of Examples 16-18 can optionally include wherein the operations further comprising: responsive to failure of integrity verification of the data transfer, updating the access control bits for the memory pages of the destination address to indicate that the memory pages are free, wherein the NIC is allowed to write to the memory pages of the destination address when the access control bits indicate that the memory pages are free. In Example 20, the subject matter of Examples 17-19 can optionally include wherein other memory pages of the memory that are not registered to the NIC have access control bits set in the page tables to indicate being unregistered, and wherein the NIC is preventing from accessing the other memory pages with the access control bits set as unregistered.

Example 21 is a system for facilitating in-place memory copy during remote data transfer in a heterogeneous compute environment. The system of Example 21 can optionally include a memory to store a block of data, a source network interface controller (NIC) communicably coupled to the memory, and a processor communicably coupled to the memory and the source NIC, the processor to provide a first trusted execution environment (TEE) to run an application, wherein the processor is to: receive data via a network interface card (NIC) of a hardware accelerator device as part of data transfer from an application of remote application server platform; identify a destination address of memory of the hardware accelerator device to write the data; determine that access control bits of the destination address in page tables maintained by a memory management unit (MMU) indicate that memory pages of the destination address are both registered and free; in response to the access control bits indicating that the memory pages of the destination address are both registered and free, write the data to the memory pages of the destination address; and subsequent to writing the data to the memory pages, update the access control bits for memory pages of the destination address to indicate that the memory pages are restricted, wherein setting the access control bits to restricted prevents the NIC and a compute kernel of the hardware accelerator device from accessing the memory pages.

In Example 22, the subject matter of Example 21 can optionally include wherein the processor is further to: responsive to successful integrity verification of the data transfer, update the access control bits for the memory pages of the destination address to indicate that the memory pages are live, wherein the compute kernel is allowed to consume the data from the memory pages when the access control bits indicate the memory pages are live. In Example 23, the subject matter of any one of Examples 21-22 can optionally include wherein the hardware accelerator device comprises a cryptographic engine to decrypt contents of the data that is encrypted and integrity-protected by the application, and wherein the cryptographic engine to perform integrity verification of the decrypted data by computing a first hash of the destination address and comparing that to a second hash that is provided with the data, while using a message authentication code (MAC) computed over the data.

In Example 24, the subject matter of any one of Examples 21-23 can optionally include wherein the NIC is a remote direct memory access (RDMA) NIC (RNIC) to perform data transfers with the application server platform using an RDMA protocol. In Example 25, the subject matter of any one of Examples 21-24 can optionally include wherein the data is received via a data communication channel that is an integrity-protected data channel between the hardware accelerator device and an application server platform, the data communication channel established via an attestation and key exchange protocol; and wherein a control communication channel that is separate from the data communication channel is secured between the hardware accelerator device and the application server platform.

In Example 26, the subject matter of any one of Examples 21-25 can optionally include wherein the processor is further to: responsive to failure of integrity verification of the data transfer, update the access control bits for the memory pages of the destination address to indicate that the memory pages are free, wherein the NIC is allowed to write to the memory pages of the destination address when the access control bits indicate that the memory pages are free. In Example 27, the subject matter of any one of Examples 21-26 can optionally include wherein other memory pages of the memory that are not registered to the NIC have access control bits set in the page tables to indicate being unregistered, and wherein the NIC is preventing from accessing the other memory pages with the access control bits set as unregistered.

In Example 28, the subject matter of any one of Examples 21-27 can optionally include wherein the access control bits comprise three bits in the page tables. In Example 29, the subject matter of any one of Examples 21-28 can optionally include wherein a first bit of the access control bits indicates a registered/unregistered status, a second bit of the access control bits indicates a free status, and a third bit of the access control bits indicates a live status, and wherein when the second bit and third bit are not set this indicates a restricted status. In Example 30, the subject matter of any one of Examples 21-29 can optionally include wherein the processor comprises one or more of a graphics processing unit (GPU), a central processing unit (CPU), or a hardware accelerator, and wherein the accelerator platform comprises a hardware accelerator device receiving offload of workloads from the processor.

Example 31 is an apparatus for facilitating in-place memory copy during remote data transfer in a heterogeneous compute environment, comprising means for receiving, via a network interface card (NIC) of a hardware accelerator device, data as part of data transfer from application of remote application server platform; means for identifying, using the hardware accelerator device, a destination address of memory of the hardware accelerator device to write the data; determining that access control bits of destination address in page tables maintained by a memory management unit (MMU) indicate that memory pages of the destination address are both registered and free; in response to the access control bits indicating that the memory pages of the destination address are both registered and free, means for writing the data to the memory pages of the destination address; and subsequent to writing the data to the memory pages, means for updating the access control bits for memory pages of the destination address to indicate that the memory pages are restricted, wherein setting the access control bits to restricted prevents the NIC and a compute kernel of the hardware accelerator device from accessing the memory pages. In Example 32, the subject matter of Example 31 can optionally include the apparatus further configured to perform the method of any one of the Examples 12 to 15.

Example 33 is at least one machine readable medium comprising a plurality of instructions that in response to being executed on a computing device, cause the computing device to carry out a method according to any one of Examples 11-15. Example 34 is an apparatus for facilitating in-place memory copy during remote data transfer in a heterogeneous compute environment, configured to perform the method of any one of Examples 11-15. Example 35 is an apparatus for facilitating in-place memory copy during remote data transfer in a heterogeneous compute environment, comprising means for performing the method of any one of Examples 11-15. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
   a processor to:
   receive data, via a network interface card (NIC) of a hardware accelerator device, as part of data transfer from an application of remote application server platform;
   identify a destination address of memory of the hardware accelerator device to write the data;
   determine that access control bits of the destination address in page tables maintained by a memory management unit (MMU) indicate that memory pages of the destination address are both registered and free;
   in response to the access control bits indicating that the memory pages of the destination address are both registered and free, write the data to the memory pages of the destination address; and
   subsequent to writing the data to the memory pages, update the access control bits for the memory pages of the destination address to indicate that the memory pages are restricted, wherein setting the access control bits to restricted prevents the NIC and a compute kernel of the hardware accelerator device from accessing the memory pages.

2. The apparatus of claim 1, wherein the processor is further to: responsive to successful integrity verification of the data transfer, update the access control bits for the memory pages of the destination address to indicate that the memory pages are live, wherein the compute kernel is allowed to consume the data from the memory pages when the access control bits indicate the memory pages are live.

3. The apparatus of claim 1, wherein the hardware accelerator device comprises a cryptographic engine to decrypt contents of the data that is encrypted and integrity-protected by the application, and wherein the cryptographic engine to perform integrity verification of the decrypted contents of the data by computing a first hash of the destination address and comparing that to a second hash that is provided with the data, while using a message authentication code (MAC) computed over the data.

4. The apparatus of claim 1, wherein the NIC is a remote direct memory access (RDMA) NIC (RNIC) to perform data transfers with the remote application server platform using an RDMA protocol.

5. The apparatus of claim 1, wherein the data is received via a data communication channel that is an integrity-protected data channel between the hardware accelerator device and an application server platform, the data communication channel established via an attestation and key exchange protocol; and wherein a control communication channel that is separate from the data communication channel is secured between the hardware accelerator device and the application server platform.

6. The apparatus of claim 1, wherein the processor is further to: responsive to failure of integrity verification of the data transfer, update the access control bits for the memory pages of the destination address to indicate that the memory pages are free, wherein the NIC is allowed to write to the memory pages of the destination address when the access control bits indicate that the memory pages are free.

7. The apparatus of claim 1, wherein other memory pages of the memory that are not registered to the NIC have the access control bits set in the page tables to indicate being unregistered, and wherein the NIC is preventing from accessing the other memory pages with the access control bits set as unregistered.

8. The apparatus of claim 1, wherein the access control bits comprise three bits in the page tables.

9. The apparatus of claim 1, wherein a first bit of the access control bits indicates a registered/unregistered status, a second bit of the access control bits indicates a free status, and a third bit of the access control bits indicates a live status, and wherein when the second bit and the third bit are not set this indicates a restricted status.

10. The apparatus of claim 1, wherein the processor comprises one or more of a graphics processing unit (GPU), a central processing unit (CPU), or a hardware accelerator.

11. A method comprising:
receiving, by a network interface card (NIC) of a hardware accelerator device, data as part of data transfer from application of remote application server platform;
identifying, by the hardware accelerator device, a destination address of memory of the hardware accelerator device to write the data;
determining that access control bits of the destination address in page tables maintained by a memory management unit (MMU) indicate that memory pages of the destination address are both registered and free;
in response to the access control bits indicating that the memory pages of the destination address are both registered and free, writing the data to the memory pages of the destination address; and
subsequent to writing the data to the memory pages, updating the access control bits for the memory pages of the destination address to indicate that the memory pages are restricted,
wherein setting the access control bits to restricted prevents the NIC and a compute kernel of the hardware accelerator device from accessing the memory pages.

12. The method of claim 11, further comprising: responsive to successful integrity verification of the data transfer, updating the access control bits for the memory pages of the destination address to indicate that the memory pages are live, wherein the compute kernel is allowed to consume the data from the memory pages when the access control bits indicate the memory pages are live.

13. The method of claim 11, wherein the hardware accelerator device comprises a cryptographic engine to decrypt contents of the data that is encrypted and integrity-protected by the application, and wherein the cryptographic engine to perform integrity verification of the decrypted contents of the data by computing a first hash of the destination address and comparing that to a second hash that is provided with the data, while using a message authentication code (MAC) computed over the data.

14. The method of claim 11, further comprising: responsive to failure of integrity verification of the data transfer, updating the access control bits for the memory pages of the destination address to indicate that the memory pages are free, wherein the NIC is allowed to write to the memory pages of the destination address when the access control bits indicate that the memory pages are free.

15. The method of claim 11, wherein other memory pages of the memory that are not registered to the NIC have the access control bits set in the page tables to indicate being unregistered, and wherein the NIC is preventing from accessing the other memory pages with the access control bits set as unregistered.

16. A non-transitory machine-readable storage medium having stored thereon executable computer program instructions that, when executed by one or more processors, cause the one or more processors to perform operations comprising:
receiving, by a network interface card (NIC) of a hardware accelerator platform comprising the one or more processors, data as part of data transfer from application of remote application server platform to a hardware accelerator device of the hardware accelerator platform;
identifying, by the hardware accelerator device, a destination address of memory of the hardware accelerator device to write the data;
determining that access control bits of the destination address in page tables maintained by a memory management unit (MMU) indicate that memory pages of the destination address are both registered and free;
in response to the access control bits indicating that the memory pages of the destination address are both registered and free, writing the data to the memory pages of the destination address; and
subsequent to writing the data to the memory pages, updating the access control bits for the memory pages of the destination address to indicate that the memory pages are restricted, wherein setting the access control bits to restricted prevents the NIC and a compute kernel of the hardware accelerator device from accessing the memory pages.

17. The non-transitory machine-readable storage medium of claim 16, wherein the operations further comprising: responsive to successful integrity verification of the data transfer, updating the access control bits for the memory pages of the destination address to indicate that the memory pages are live, wherein the compute kernel is allowed to consume the data from the memory pages when the access control bits indicate the memory pages are live.

18. The non-transitory machine-readable storage medium of claim 16, wherein the hardware accelerator device comprises a cryptographic engine to decrypt contents of the data that is encrypted and integrity-protected by the application, and wherein the cryptographic engine to perform integrity verification of the decrypted contents of the data by computing a first hash of the destination address and comparing that to a second hash that is provided with the data, while using a message authentication code (MAC) computed over the data.

19. The non-transitory machine-readable storage medium of claim 16, wherein the operations further comprising: responsive to failure of integrity verification of the data transfer, updating the access control bits for the memory pages of the destination address to indicate that the memory pages are free, wherein the NIC is allowed to write to the memory pages of the destination address when the access control bits indicate that the memory pages are free.

20. The non-transitory machine-readable storage medium of claim 16, wherein other memory pages of the memory that are not registered to the NIC have the access control bits set in the page tables to indicate being unregistered, and wherein the NIC is preventing from accessing the other memory pages with the access control bits set as unregistered.

* * * * *